(12) United States Patent
Uenuma et al.

(10) Patent No.: US 7,987,032 B2
(45) Date of Patent: Jul. 26, 2011

(54) DRIVER FEELING ADJUSTING APPARATUS

(75) Inventors: Kenya Uenuma, Yokohama (JP); Keijiro Iwao, Yokohama (JP); Tatsuo Sakai, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1124 days.

(21) Appl. No.: 11/790,411

(22) Filed: Apr. 25, 2007

(65) Prior Publication Data

US 2007/0255469 A1 Nov. 1, 2007

(30) Foreign Application Priority Data

Apr. 26, 2006 (JP) ................................. 2006-122199
Mar. 9, 2007 (JP) ................................. 2007-060775

(51) Int. Cl.
*G05D 1/00* (2006.01)
*G05D 3/00* (2006.01)
(52) U.S. Cl. ............ 701/49; 701/36; 701/41; 296/65.13
(58) Field of Classification Search ..................... 701/36, 701/49, 41; 353/13; 297/216.1, 406, 61, 297/391, 40; 296/65.13
See application file for complete search history.

(56) References Cited

U.S. PATENT DOCUMENTS

| | | | | |
|---|---|---|---|---|
| 6,064,932 A * | 5/2000 | François | .......................... | 701/49 |
| 6,113,117 A * | 9/2000 | Mimura | ..................... | 280/47.11 |
| 6,344,805 B1 * | 2/2002 | Yasui et al. | ................ | 340/932.2 |
| 6,411,867 B1 * | 6/2002 | Sakiyama et al. | ................. | 701/1 |
| 6,424,895 B1 * | 7/2002 | Shimizu et al. | .................. | 701/41 |
| 6,463,363 B1 * | 10/2002 | Okuda | ............... | 701/1 |
| 6,704,653 B2 * | 3/2004 | Kuriya et al. | ................. | 701/301 |
| 6,890,443 B2 * | 5/2005 | Adams | .......................... | 210/695 |
| 6,959,970 B2 * | 11/2005 | Tseng | ............................ | 303/146 |
| 7,029,033 B2 * | 4/2006 | Tobata | ......................... | 280/807 |
| 7,089,099 B2 * | 8/2006 | Shostak et al. | ................... | 701/32 |
| 7,165,644 B2 * | 1/2007 | Offerle et al. | ................. | 180/244 |
| 7,379,800 B2 * | 5/2008 | Breed | .............................. | 701/29 |
| 2001/0026317 A1 * | 10/2001 | Kakinami et al. | ............. | 348/148 |
| 2002/0005779 A1 * | 1/2002 | Ishii et al. | ...................... | 340/436 |
| 2002/0123829 A1 * | 9/2002 | Kuriya et al. | ..................... | 701/1 |
| 2003/0083063 A1 * | 5/2003 | Wang et al. | ................... | 455/427 |
| 2003/0209900 A1 * | 11/2003 | Tobata | ......................... | 280/807 |

(Continued)

FOREIGN PATENT DOCUMENTS

JP 61-285147 A 12/1986

(Continued)

OTHER PUBLICATIONS

Study on a new four-wheel-steering control method at low speeds-front-end path memorizing method; Adachi, K.. et al.; Automotive Electronics, 1991., Eighth International Conference on; Publication Year: 1991 , pp. 214-218.*

(Continued)

*Primary Examiner* — Cuong H Nguyen
(74) *Attorney, Agent, or Firm* — Foley & Lardner LLP

(57) ABSTRACT

A driver feeling adjusting apparatus includes a seat that is fixed to a vehicle and on which a driver is seated, a movable portion that is provided in the seat and that can be displaced in a vehicle lateral direction or a yaw direction, and a control unit that displaces the movable portion in an opposite direction to a direction of centripetal acceleration or a yaw rate in turning, and enables the driver to feel easy steering.

11 Claims, 21 Drawing Sheets

U.S. PATENT DOCUMENTS

| | | | |
|---|---|---|---|
| 2004/0193347 A1* | 9/2004 | Harumoto et al. | 701/45 |
| 2005/0206225 A1* | 9/2005 | Offerle et al. | 303/7 |
| 2005/0206226 A1* | 9/2005 | Lu et al. | 303/20 |
| 2005/0206229 A1* | 9/2005 | Lu et al. | 303/123 |
| 2005/0206231 A1* | 9/2005 | Lu et al. | 303/146 |
| 2005/0206232 A1* | 9/2005 | Offerle | 303/146 |
| 2005/0206233 A1* | 9/2005 | Offerle et al. | 303/146 |
| 2005/0206234 A1* | 9/2005 | Tseng et al. | 303/146 |
| 2005/0209762 A1* | 9/2005 | Lu et al. | 701/70 |
| 2005/0209763 A1* | 9/2005 | Offerle et al. | 701/83 |
| 2005/0236894 A1* | 10/2005 | Lu et al. | 303/139 |
| 2006/0076828 A1* | 4/2006 | Lu et al. | 303/146 |

FOREIGN PATENT DOCUMENTS

| | | | |
|---|---|---|---|
| JP | 63-004733 U | | 1/1988 |
| JP | 63-151549 A | | 6/1988 |
| JP | 1-167928 U | | 11/1989 |
| JP | 3-034130 U | | 4/1991 |
| JP | 3-253230 | * | 10/1991 |
| JP | 4-062419 | * | 3/1992 |
| JP | 5-092710 A | | 4/1993 |
| JP | 5-229373 A | | 9/1993 |
| JP | 6-018831 Y2 | | 5/1994 |
| JP | 6-284942 A | | 10/1994 |
| JP | 7-257137 A | | 9/1995 |
| JP | 7-315088 A | | 12/1995 |
| JP | 8-040295 A | | 2/1996 |
| JP | 2000-140699 | * | 5/2000 |
| JP | 2000-281467 | * | 9/2000 |
| JP | P 2002-136092 | * | 5/2002 |
| JP | 2007-1466 A | | 1/2007 |
| WO | PCT/JP01/03957 | * | 11/2001 |

OTHER PUBLICATIONS

Study on fail-safe strategy of electric power steering system; Lianbing Li et al.; Mechatronics and Automation, 2009. ICMA 2009. International Conference on; Digital Object Identifier: 10.1109/ICMA.2009.5246451; Publication Year: 2009, pp. 4775-4779.*

Angular momentum primitives for human turning: Control implications for biped robots; Farrell, M.T. et al.; Humanoid Robots, 2008. Humanoids 2008. 8th IEEE-RAS International Conference on; Digital Object Identifier: 10.1109/ICHR.2008.4755962 Publication Year: 2008, pp. 163-167.*

Turning mechanism of a smooth body by amplitude and period control in curvature; Daeyeon Kim et al.; Control, Automation and Systems, 2008. ICCAS 2008. International Conference on; Digital Object Identifier: 10.1109/ICCAS.2008.4694515 Publication Year: 2008, pp. 1765-1768.*

Fuzzy-Logic-Based Sliding-Mode Controller Design for Position-Sensorless Electric Vehicle; Jian-Bo Cao; Bing-Gang Cao; Power Electronics, IEEE Transactions on; vol. 24, Issue: 10; Digital Object Identifier: 10.1109/TPEL.2009.2020429 Publication Year: 2009, pp. 2368-2378.*

Adaptive setpoint control of underwater vehicle-manipulator systems; Sun, Y.C.; Cheah, C.C.; Robotics, Automation and Mechatronics, 2004 IEEE Conference on; vol. 1; Digital Object Identifier: 10.1109/RAMECH.2004.1438959 Publication Year: 2004, pp. 434-439 vol. 1.*

Adaptive setpoint control for autonomous underwater vehicles; Sun, Y.C.; Cheah, C.C.; Decision and Control, 2003. Proceedings. 42nd IEEE Conference on; vol. 2; Digital Object Identifier: 10.1109/CDC.2003.1272782 Publication Year: 2003, pp. 1262-1267 vol. 2.*

Robust observer design for underwater vehicles; Refsnes, J.E. et al.; Computer Aided Control System Design, 2006 IEEE International Conference on Control Applications, 2006 IEEE International Symposium on Intelligent Control, 2006 IEEE; Digital Object Identifier: 10.1109/CACSD-CCA-ISIC.2006.4776665; Publication Year: 2006, pp. 313-319.*

Design of an integrated AFS/DYC based on fuzzy logic control; Karbalaei, R.; Ghaffari, A.; Kazemi, R.; Tabatabaei, S.H.; Vehicular Electronics and Safety, 2007. ICVES. IEEE International Conference on; Digital Object Identifier: 10.1109/ICVES.2007.4456356; Publication Year: 2007, pp. 1-6.*

Research on control strategy and bench test of automobile Steer-by-Wire system; Yu Lei-yan; Qi Yao-guang; Liu Feng; Vehicle Power and Propulsion Conference, 2008. VPPC '08. IEEE; Digital Object Identifier: 10.1109/VPPC.2008.4677534 Publication Year: 2008, pp. 1-6.*

A new pitch/yaw stabilized bathymetric survey system; Kiesel, K.C.; OCEANS 2000 MTS/IEEE Conference and Exhibition vol. 1; Digital Object Identifier: 10.1109/OCEANS.2000.881261; Publication Year: 2000, pp. 201-205 vol. 1*

Analysis of head tilt strategy of car drivers; Fujisawa, S.; Wada, T.; Kamiji, N.; Doi, S.; ICCAS-SICE, 2009 Publication Year: 2009, pp. 4161-4165.*

"Technique for Improving Maneuverability of Vehicle," Society of Automotive Engineers of Japan, 1989, pp. 68-69.

* cited by examiner

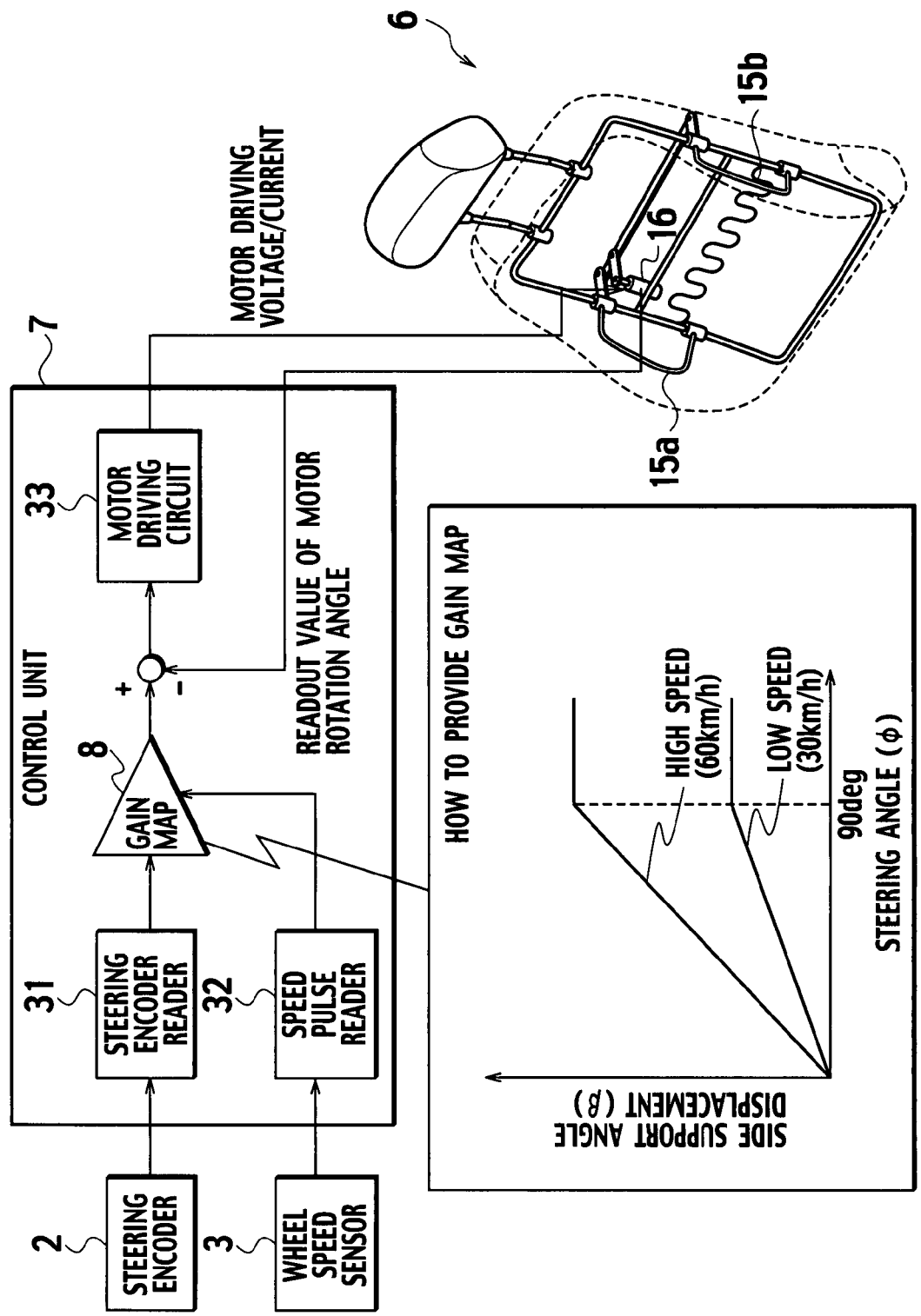

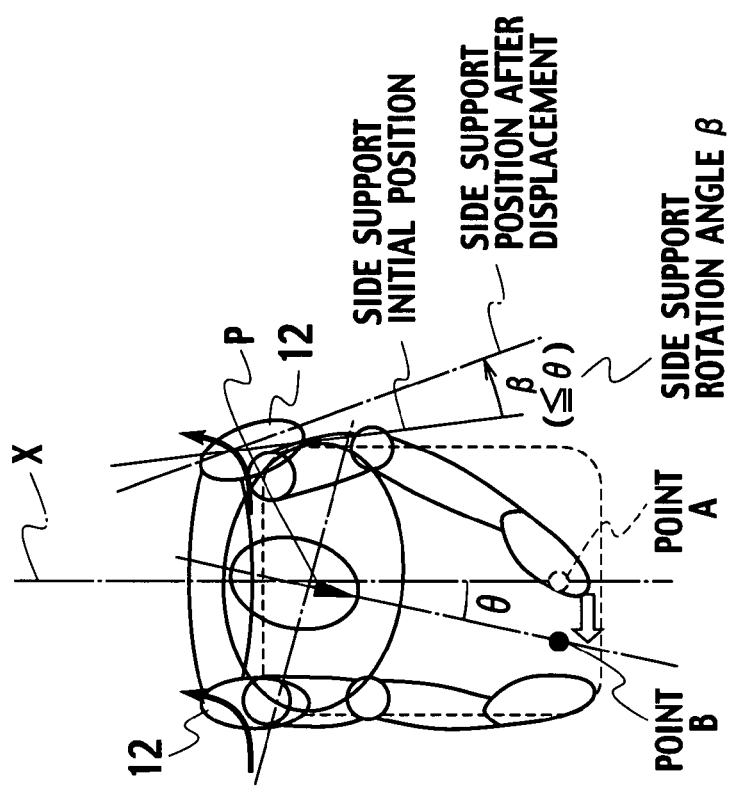
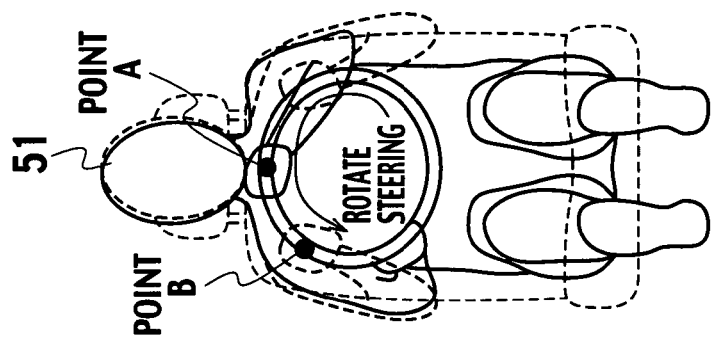
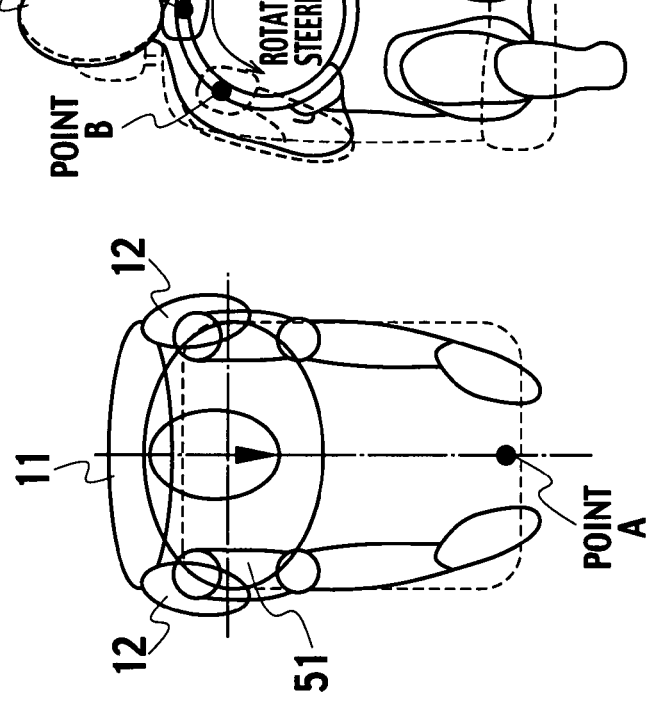

FIG. 11
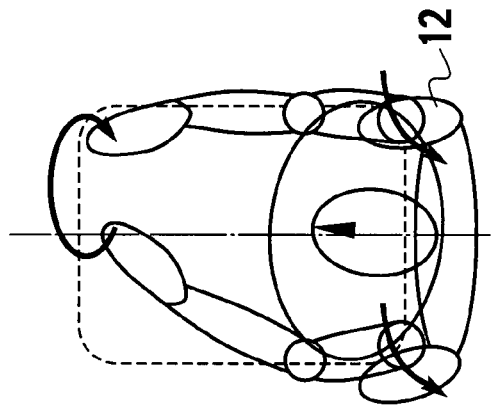
C: DRIVE IN OUTER DIRECTION OF TURNING
- ROLLING IS SMOOTH
- SMOOTH RESPONSE
- RELAXED DRIVING IS POSSIBLE
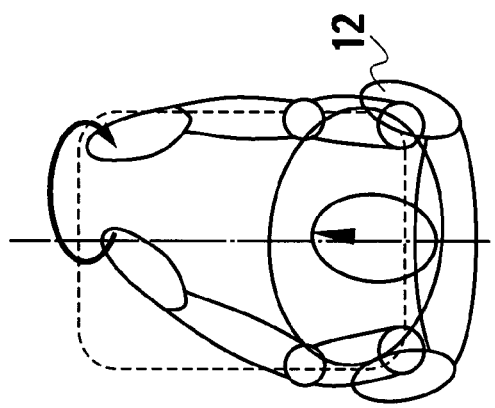
B: NORMAL
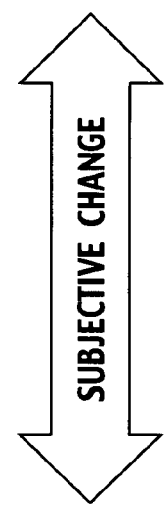
SUBJECTIVE CHANGE
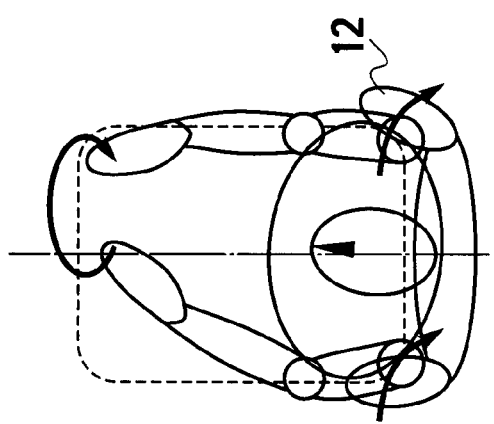
A: DRIVE IN INNER DIRECTION OF TURNING
- SUSPENSION HAS BECOME FIRM
- VEHICLE RESPONSE IMPROVED
- SPORTY SENSE

AT TIME OF RIGHT WHEEL

POINT A

POINT B
POINT A
ROTATE STEERING

SIDE SUPPORT POSITION AFTER DISPLACEMENT
SIDE SUPPORT INITIAL POSITION
POINT B
POINT A
SIDE SUPPORT ROTATION ANGLE $\alpha$
$\alpha$ ($\leq \theta$)

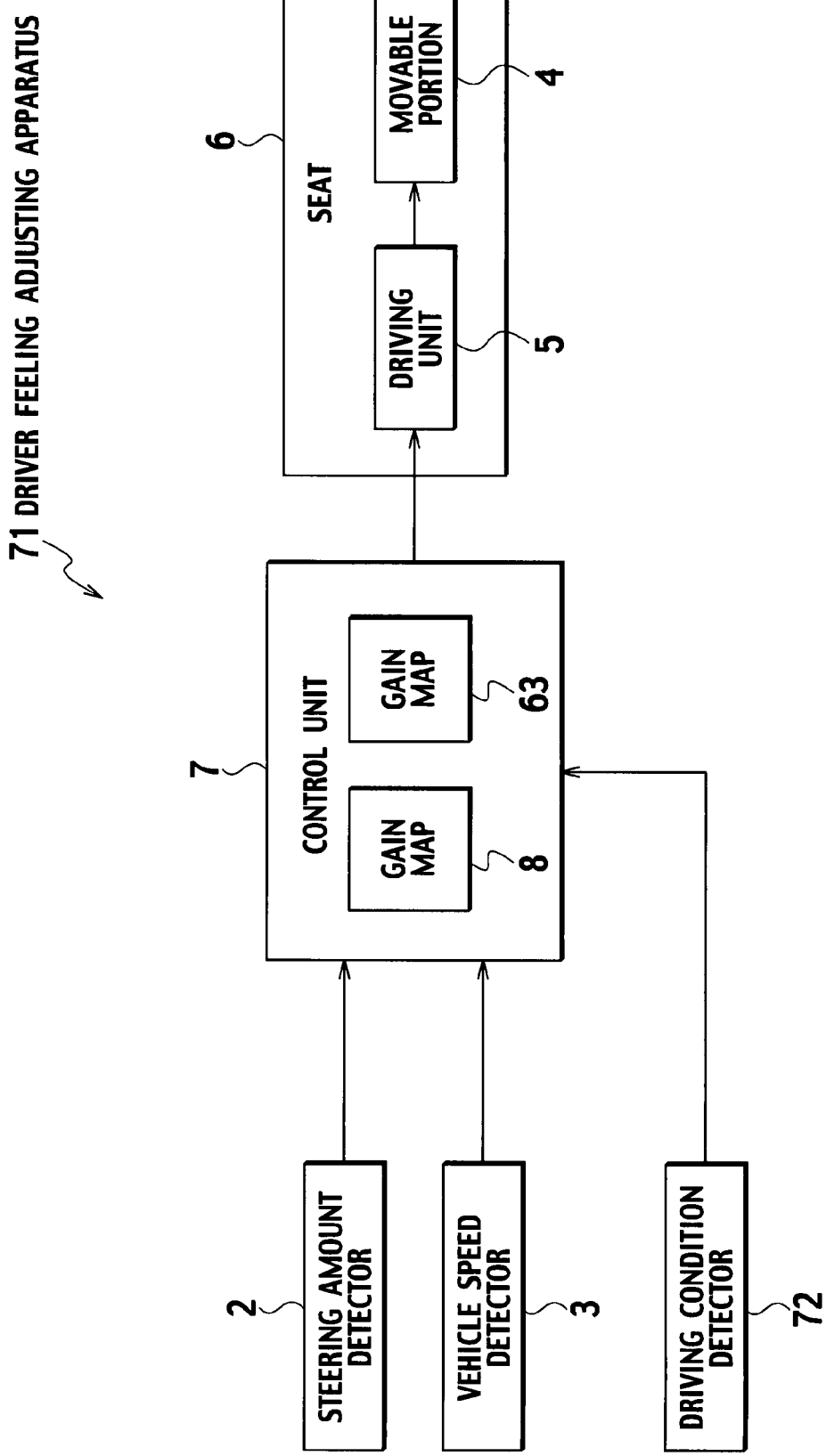

DRIVER FEELING ADJUSTING APPARATUS

BACKGROUND OF THE INVENTION

1. Field of the Invention

The present invention relates to a driver feeling adjusting apparatus that controls a seat corresponding to a driving condition of a vehicle.

2. Description of the Related Art

It has been known that if suspension of vehicles is firm, driving stability at turning improves, for example, from Japanese Patent Laid-open Publication No. H5-092710.

SUMMARY OF THE INVENTION

However, if a driving stability at turning is improved, rises of acceleration in a vehicle lateral direction and a yaw rate become quick with respect to a steering operation by a driver, and such a problem arises that drivers not used to firm suspension feel the rises are abrupt and cannot steer vehicles easily.

In view of the above situation, the present invention is achieved to propose a driver feeling adjusting apparatus that adjusts a feeling of a driver such that the driver can easily steer a vehicle without lowering the driving stability at turning.

To solve the above problem, a driver feeling adjusting apparatus according to the present invention includes a seat that is fixed to a vehicle and on which a driver is seated, a movable portion that is provided in the seat and that can be displaced in a vehicle lateral direction or in a yaw direction, and a control unit that displaces the movable portion in an opposite direction to a direction of a centripetal acceleration or a yaw rate, at turning.

The driver feeling adjusting apparatus according to the present invention includes the seat that has the movable portion that can be displaced in the vehicle lateral direction or in the yaw direction, and the movable portion is displaced in the opposite direction to the direction of the centripetal acceleration or the yaw rate at turning. Therefore, the driver can easily steer the vehicle without changing driving stability of the vehicle itself at turning.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

FIG. 2 are perspective views showing a specific configuration of a seat shown in FIG. 1; where

FIG. 3 are a perspective view and a top view showing a relationship between displacement of side supports shown in FIG. 2 and a steering operation by a driver; where

FIG. 4 is a diagram specifically showing an entire configuration of the driver feeling adjusting apparatus shown in FIG. 1, and a graph showing an example of a gain map;

FIG. 5A is a diagram showing an upper body of a driver viewed from above when a vehicle is driving straight, FIG. 5B shows a state in which a point on a steering that is positioned at a point A when driving straight is moved to a point B, and FIG. 5C is a diagram showing the upper body of the driver viewed from above in the state shown in FIG. 5B;

FIG. 11 is a top view showing a relationship between the displacement of the side supports and a steering operation by a driver;

FIG. 16 are a perspective view and a top view showing a relationship between displacement of the side supports and a steering operation by a driver; where

FIG. 21 is a block diagram showing a configuration of a driver feeling adjusting apparatus according to a fourth embodiment of the present invention.

DETAILED DESCRIPTION OF THE PREFERRED EMBODIMENTS

First Embodiment

Figure 1:
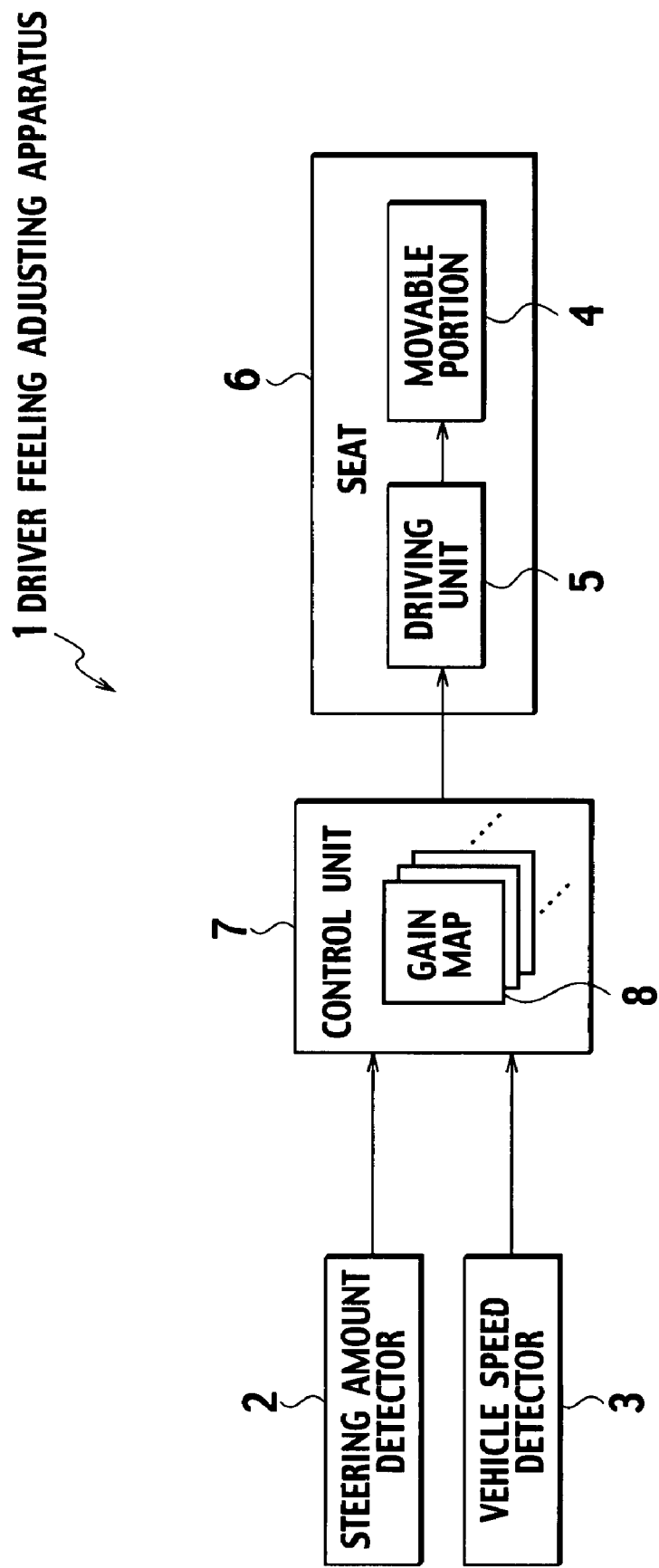
FIG. 1 is a block diagram showing a configuration of a driver feeling adjusting apparatus according to a first embodiment of the present invention.

As shown in FIG. 1, a driver feeling adjusting apparatus 1 according to a first embodiment of the present invention includes a steering amount detector 2 that detects an amount of operating a steering (steering amount), a vehicle speed detector 3 that detects a speed of a vehicle, a seat 6 that is fixed to the vehicle and on which a driver is seated, a movable portion 4 that is displaced in a vehicle lateral direction or a yaw direction, a driving unit 5 that drives the movable portion 4 provided in the seat 6, and a control unit 7 that controls a displacement amount of the movable portion 4 based on the steering amount detected by the steering amount detector 2.

The movable portion 4 makes displacement in an opposite direction to a direction of centripetal acceleration or a yaw rate.

The control unit 7 includes a gain map 8 defining a displacement amount of the movable portion 4 with respect to the steering amount detected by the steering amount detector 2, calculates a displacement amount of the movable portion 4 based on this gain map 8, and transmits an instruction to drive the movable portion 4 to the driving unit 5. As the gain map 8, a plurality of gain maps are prepared that differ in a relationship between the displacement amount and the steering amount corresponding to a speed detected by the vehicle speed detector 3. The control unit 7 switches the gain map 8 corresponding to a speed detected by the vehicle speed detector 3.

Figure 2A:
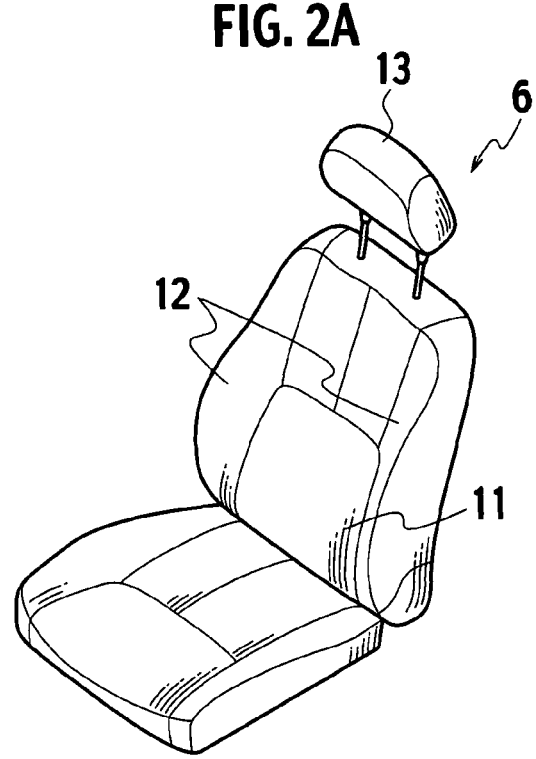
FIG. 2A shows an external appearance thereof.
Figure 2B:
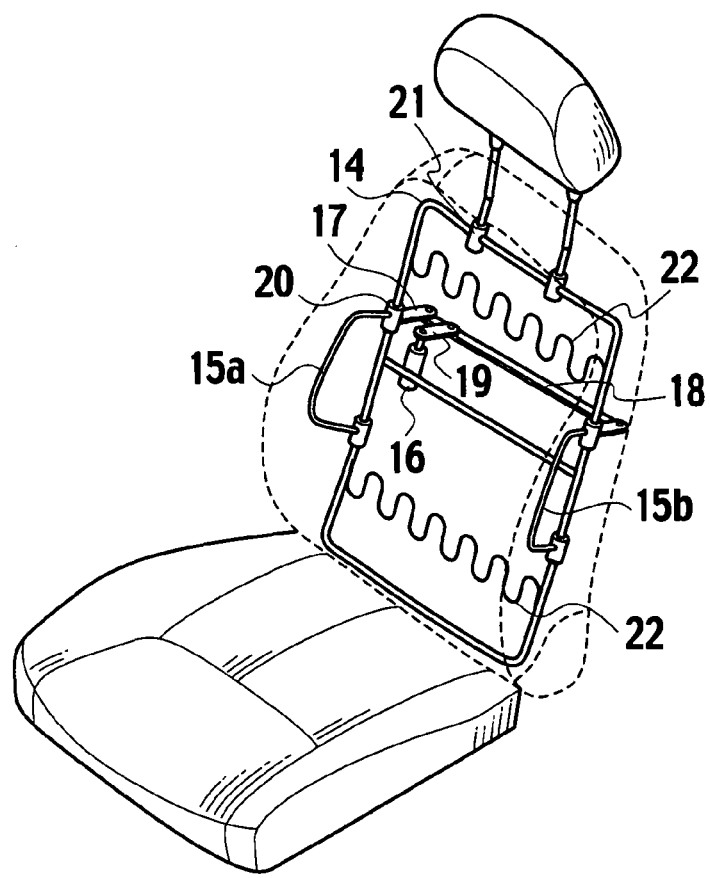
FIG. 2B shows an internal configuration thereof.

FIG. 2 are diagrams showing a specific configuration of the seat 6 shown in FIG. 1. FIG. 2A shows an external appearance of the seat 6, and FIG. 2B shows an internal configuration of the seat 6.

As shown in FIG. 2A, the seat 6 includes a seatback 11 (seat rear surface) that contacts the back of a driver when the driver is seated, a right and left pair of side supports 12 that are arranged on both sides of the seatback 11, and a headrest 13 that is arranged above the seatback 11. The side supports 12 are inclined toward the driver so as to fit along the sides of the driver.

As shown in FIG. 2B, the internal configuration of the seat 6 includes a seat frame 14 that frames the seat 6, a right and left pair of side support frames 15a and 15b that support the side supports 12, a motor 16 that drives the side support frames 15a and 15b at the same time, a first link 17 and a second link 18 that connect the side support frames 15a and 15b, a third link 19 that connects the second link 18 and the motor 16, a rotation supporting unit 20 that supports rotation of the side support frames 15a and 15b, a headrest mounting unit 21 with which the headrest 13 is mounted on the seat frame 14, and a cushion supporting springs 22.

The movable portion 4 in FIG. 1 corresponds to the right and left pair of side supports 12 in FIG. 2A and the side support frames 15a and 15b in FIG. 2B, and the driving unit 5 in FIG. 1 corresponds to the motor 16.

The side support frames 15a and 15b are supported by the seat frame 14 through an upper and lower pair of rotation supporting units 20, respectively, and are displaced in a vehicle lateral direction or a yaw direction. Each of the side support frames 15a and 15b are covered with cushion to form the side supports 12 shown in FIG. 2A.

A rotation axis of the motor 16 is connected to the side support frames 15a and 15b through the first to the third links 17 to 19 and the rotation supporting unit 20. The first to the third links 17 to 19 form a substantially parallel link structure, and the side support frames 15a and 15b are displaced in the vehicle lateral direction or in the yaw direction by rotation of the motor 16. In other words, the rotation of the motor 16 is transmitted as swinging movement of the side support frames 15a and 15b. According to this movement, the side supports 12 shown in FIG. 2A are displaced in the same directions. The motor 16 is fixed to the seat frame 14.

The headrest 13 shown in FIG. 2A is connected to the seat frame 14 through the headrest mounting unit 21. The seat frame 14 has a rectangular shape. Inside the rectangular shape, the cushion supporting springs 22 are arranged keeping a predetermined distance from each other.

Figure 3A:
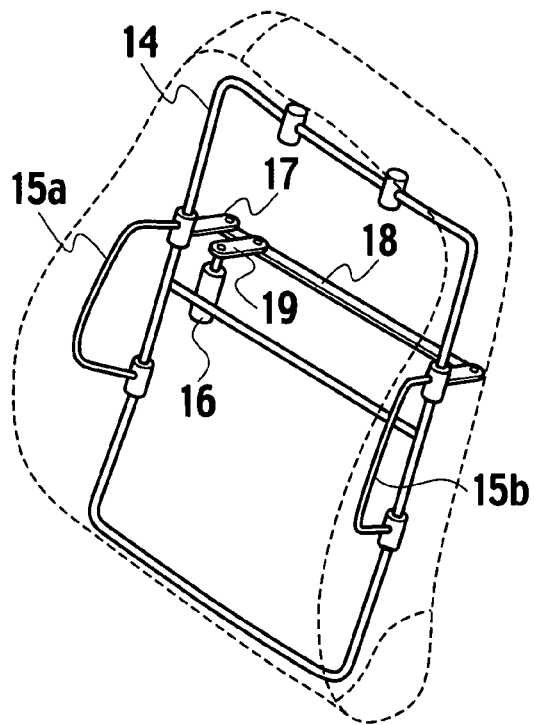
FIGS. 3A and 3B show a state at a normal time.
Figure 3B:
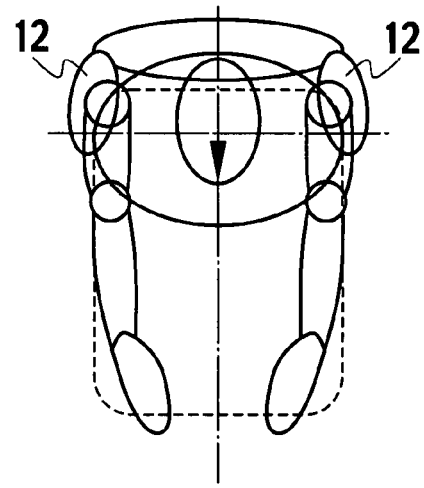

Movement of the side support frames 15a and 15b are explained next with reference to FIG. 3. As shown in FIGS. 3A and 3B, when the vehicle is not making a turn, in other words, when a steering operation is not being performed by the driver (normal time), the side support frames 15a and 15b (side supports 12) on both sides are held at positions symmetric in the vehicle lateral direction. The motor 16 is not making a rotational operation, and the first to the third links 17 to 19 are not moving either.

Figure 3C:
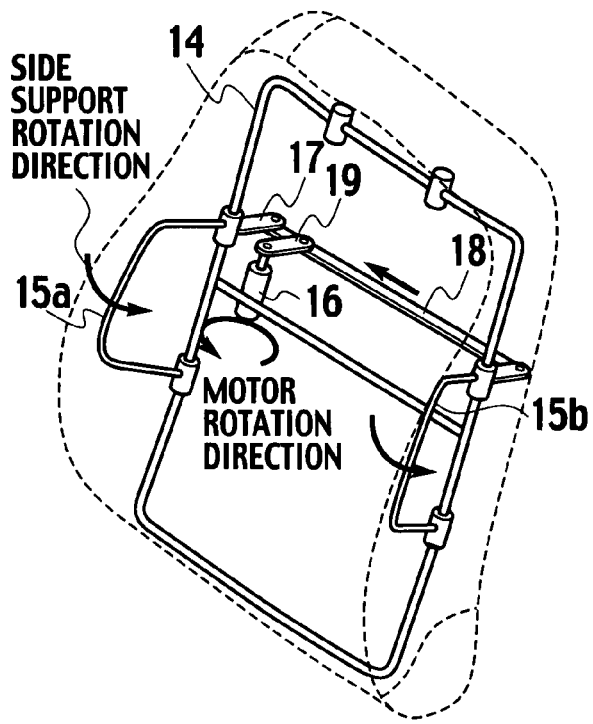
FIGS. 3C and 3D show a state at the time of motor driving (at the time of right wheel)
Figure 3D:
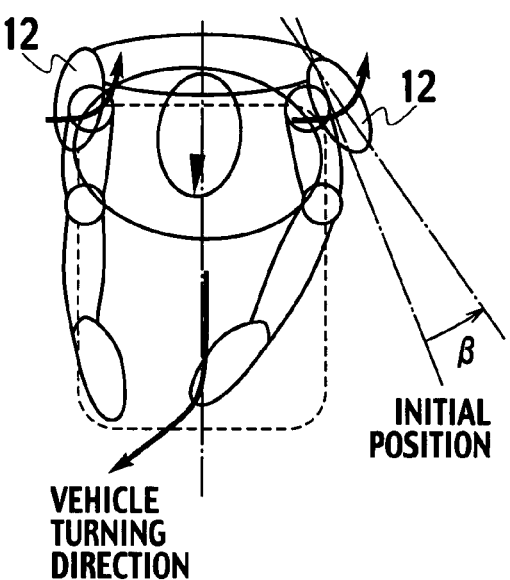

On the other hand, as shown in FIGS. 3C and 3D, when the vehicle is making a right turn, in other words, when the steering is operated to rotate rightward by the driver (at the time of right wheel), the motor 16 is caused to rotate by an angle corresponding to steering in the direction shown in FIGS. 3C and 3D. This rotation of the motor 16 is transmitted to the side support frames 15a and 15b on both sides through the first to the third links 17 to 19. Thus, the side support frames 15a and 15b (side supports 12) rotate by a rotational angle $\beta$ in an opposite direction to the yaw direction of the vehicle at the time of right wheel from a position (initial position) shown in FIGS. 3A and 3B.

A specific configuration of the driver feeling adjusting apparatus 1 shown in FIG. 1 is explained next with reference to FIG. 4. FIG. 4 is a diagram specifically showing an entire configuration of the driver feeling adjusting apparatus 1 shown in FIG. 1, and is a diagram particularly showing a configuration of the control unit 7 in detail. The control unit 7 includes a steering encoder reader 31 that reads a steering amount detected by a steering encoder (steering amount detector) 2, a speed pulse reader 32 that reads a speed of the vehicle detected by a wheel speed sensor (vehicle speed detector) 3, the gain map 8 that defines a displacement amount of the side supports 12 from the steering amount, and a motor driving circuit 33 that sends a driving command value to cause the motor 16 to rotate.

A rotation angle of the motor 16 installed in the seat 6 is read by an encoder or a potentiometer, and a signal thereof is input to the control unit 7.

The steering encoder 2 arranged on a steering wheel sends a signal to the control unit 7 when the steering is rotated. The control unit 7 that receives this signal counts signals from the steering encoder 2 to convert into a steering angle (steering amount) $\phi$, and acquires a rotation angle command value of the motor 16 by multiplying the steering angle $\phi$ by a gain obtained from the gain map 8.

Further, the rotation angle command value is input to the motor driving circuit 33 to provide a driving voltage/current to the motor 16. At this time, feedback on a current value of the rotation angle of the motor 16 is given to a preceding stage of the motor driving circuit 33, and based on this current value, a position control is performed.

As shown in FIG. 4, the control unit 7 uses the different gain map 8, for example, depending on whether the vehicle speed is low (approximately 30 km/h) or high (approximately 60 km/h), and determines the rotation angle command value of the motor 16 with respect to the steering angle φ, using the gain map 8 selected corresponding to the speed.

While the gain map 8 of the angle displacement β of the side supports 12 with respect to the steering angle φ is shown in this example, it is preferable to prepare a map of the gain in the angle displacement β of the side supports 12 with respect to the rotation angle displacement of the motor 16 considering dimensions of the first to the third links 17 to 19, in practice.

As shown in FIG. 4, the gain map 8 has a linear characteristic both at the time of low speed of 30 km/h and at the time of high speed of 60 km/m, in which the gain increases as the steering angle φ increases. However, the angle displacement β is limited by saturating the angle displacement β of the side supports 12 when the steering angle φ reaches 90°.

As described, the control unit 7 selects the gain map 8 depending on the speed of the vehicle, and acquires the angle displacement β of the side supports 12 from the steering angle φ based on the selected gain map 8.

A method of setting the maximum value of the angle displacement β of the side supports 12 is explained with reference to FIG. 5. FIG. 5A is a diagram showing an upper body of a driver 51 viewed from above when a vehicle is driving straight, and a point A indicates a point positioned at the top of the steering wheel at the time of driving straight. FIG. 5B is a diagram showing the driver 51 viewed from front, and the top of the steering that is positioned at the point A when driving straight is moved to a point B by a rightward steering operation by the driver 51. FIG. 5C is a diagram showing the upper body of the driver 51 viewed from above in this state, and as shown in FIG. 5C, the displacement amount β of the side supports 12 on both sides satisfies $0<\beta\leq\theta$, where θ represents an angle formed by a line between an eye point P of the driver 51 and the point B and an axis X in a vehicle front-rear direction.

It is thus set because when the driver 51 twists the upper body at the time of making a turn, a posture change of the upper body is made within about this range, and by setting the gain within this range, the side supports 12 move following the twist of the upper body of the driver 51, thereby enabling comfortable turning.

Although in an actual vehicle, the diameter of a steering wheel and the steering gear ratio differ depending on a vehicle type, in this example, a value of the angle θ formed by the line between the eye point P of the driver 51 and the point B and the axis X in the vehicle front-rear direction can be determined on the assumption that the steering has a typical diameter (=approximately 330 mm to 380 mm) and the gear ratio of about 13 to 20. Similarly, the upper limit of the gain changes also depending on a position of the eye point P of the driver 51 with respect to the steering wheel, in other words, an amount of sliding backward and forward of the seat 6. However, a swinging angle of the side supports 12 need not necessarily be adjusted by detecting the sliding amount of the seat 6 to strictly maintain this relationship, and the angle θ can be determined assuming the driver 51 having the average physique.

The reason why it is not necessary to control the movement of the side supports 12 strictly with respect to the steering wheel, the steering gear ratio, and the position of the eye point P is because there is no point of performing a strict position control since soft cushions are arranged on the surfaces of the side supports 12 usually.

Thus, the yaw rotation angle β as the displacement amount of the side supports 12 is set to satisfy $0<\beta\leq\theta$ with respect to the angle θ formed by the line between the point A positioned at the top of the steering wheel when driving straight and the eye point P of the driver 51 and the axis X in the vehicle front-rear direction.

[Modifications]

While in the explanation of the first embodiment, an example in which the side support frames 15a and 15b make rotational displacement in the yaw direction with respect to the seat frame 14 has been described, the present invention is not limited thereto. For example, as shown in FIG. 6, the side support frames 15a and 15b can be translated in the vehicle lateral direction with respect to the seat frame 14.

Figure 6A:
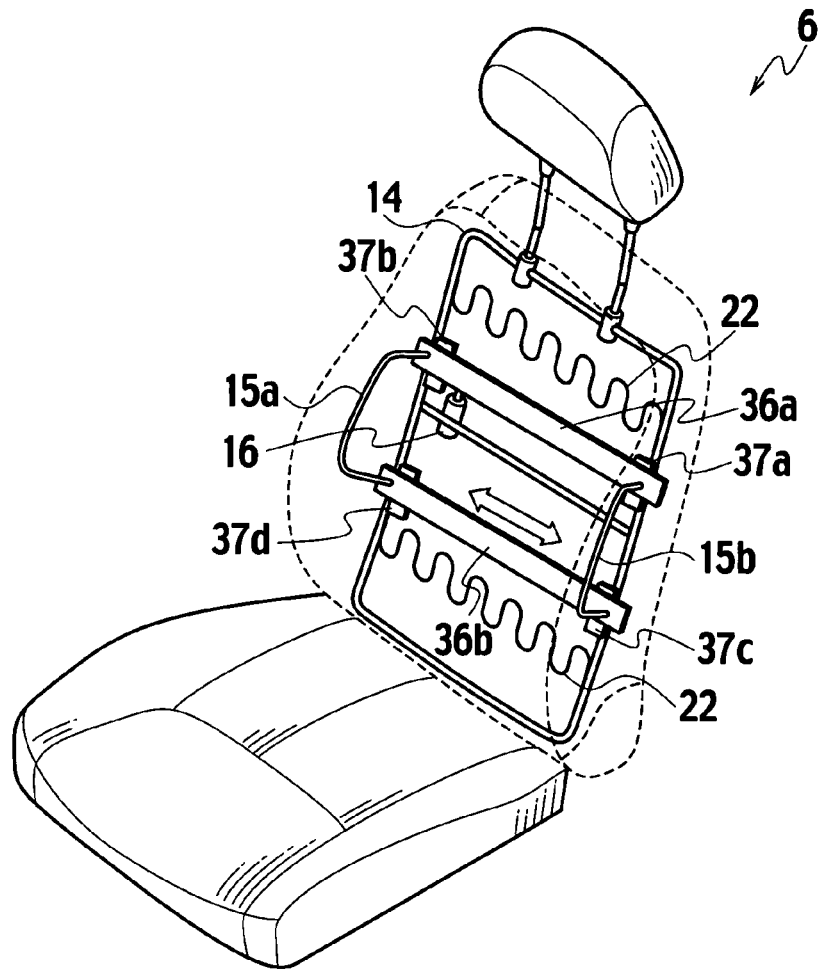
FIG. 6A is a perspective view specifically showing an internal configuration of a seat according to a modification.

FIG. 6A is a diagram showing a specific internal configuration of the seat 6 according to a modification. Different points from the internal configuration shown in FIG. 2B are explained, and explanations for the same points will be omitted. Both ends of the side support frames 15a and 15b on both sides are connected to slide rails 36a and 36b, respectively, thereby fixing relative positions of the side support frames 15a and 15b on both sides. The slide rails 36a and 36b also serve as a slide rail portion of a linear guide. Portions that correspond to sliders 37a to 37d of the linear guide are fixed to the seat frame 14. Thus, the side support frames 15a and 15b on both sides are supported so as to be integrally displaced in the vehicle lateral direction with respect to the seat frame 14.

Furthermore, rack teeth are provided on rear surfaces of the slide rails 36a and 36b, and pinion gears that engage with these rack teeth are driven by the motor fixed to the seat frame 14. This enables the rightward and leftward movement of the side support frames 15a and 15b.

Figure 6B:
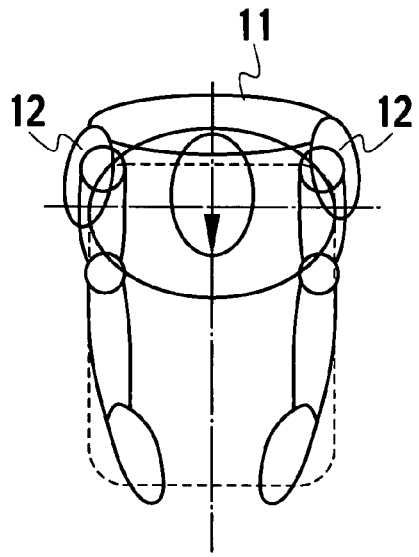
FIGS. 6B and 6C are top views showing a relationship between displacement of the side supports and a steering operation by a driver.

FIG. 6B shows the upper body of the driver 51 when normally driving straight, and the side support frames 15a and 15b are positioned symmetrically with respect to the driver 51 and the seatback 11 when driving straight.

Figure 6C:
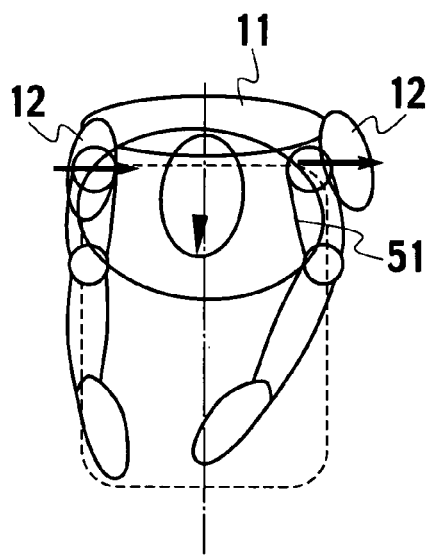

On the other hand, FIG. 6C shows the upper body of the driver 51 when making a turn, and the side support frames 15a and 15b are translated in the vehicle lateral direction at the time of turning (right wheel). The above method also enables to give the driver 51 a yaw rate feeling similar to the rotational displacement of the side supports 12.

Figure 7A:
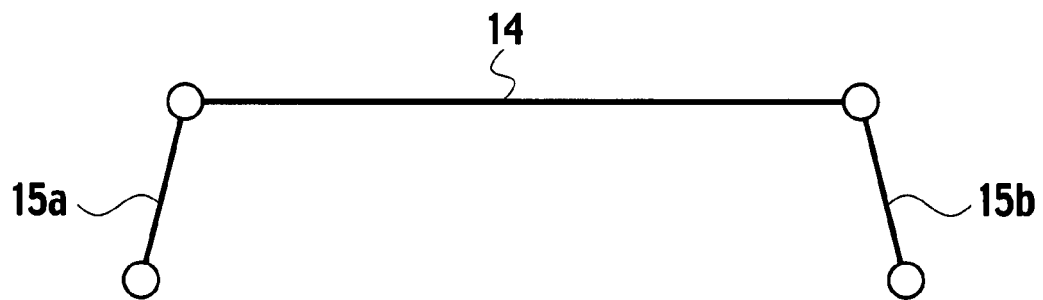
FIG. 7A is a schematic diagram showing only a seat frame and side support frames.
Figure 7B:
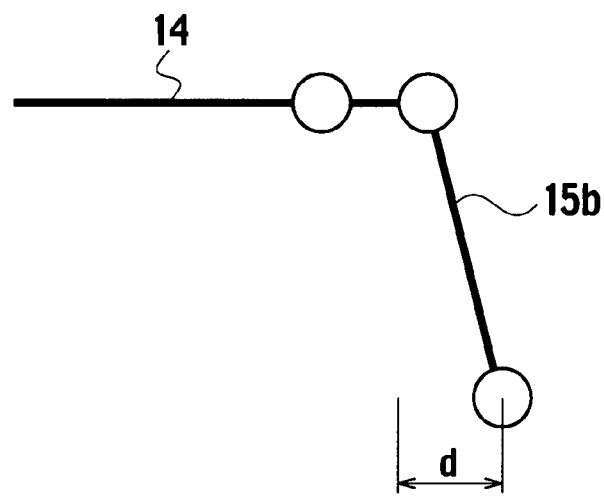
FIG. 7B shows a case where the side support frame makes translational displacement.
Figure 7C:
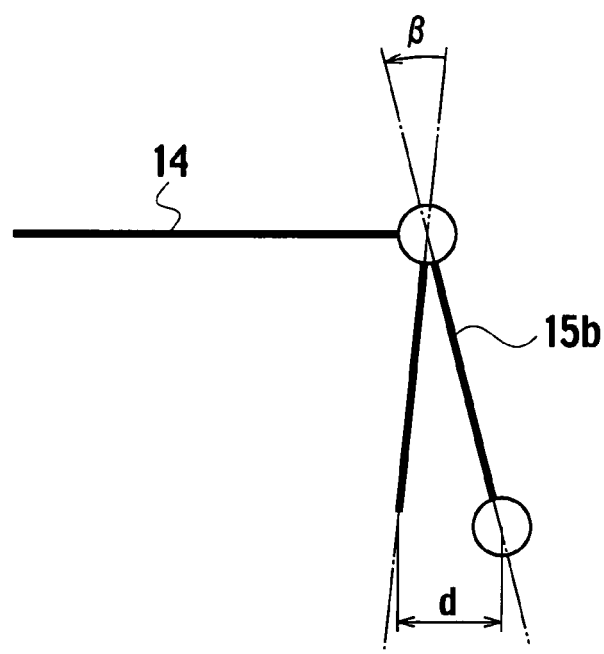
FIG. 7C shows a case where the side support frame makes rotational displacement.

When the mechanism shown in FIG. 6A is adopted, the upper limit of the displacement amount of the side supports 12 can be considered as follows. FIG. 7A is a schematic diagram showing only the seat frame 14 and the side support frames 15a and 15b. FIG. 7B shows a state in which the side support frame 15b is translated in a lateral direction from this state. The lateral displacement amount (distance) of the end of the side support frame 15b is expressed as "d". When the upper limit of the displacement amount is considered, it is assumed that the lateral displacement amount d of the end of the side support frame 15b is obtained by rotational displacement as shown in FIG. 7C, and the lateral displacement amount d is set such that the virtual rotation angle β of the side support frame 15b satisfies $0<\beta\leq\theta$ described above.

While in this example, the displaced distance of the end of the side support frame 15b is used as a representative value, besides, a contact load center of the upper body of the driver 51 with respect to the side supports 12 can be used as the representative value to consider the lateral displacement of this point. Because of elasticity of the seat cushion, there exists some robustness to a feeling of the driver 51. Therefore, by either method, the effect of the present invention does not considerably differ.

Figure 8A:
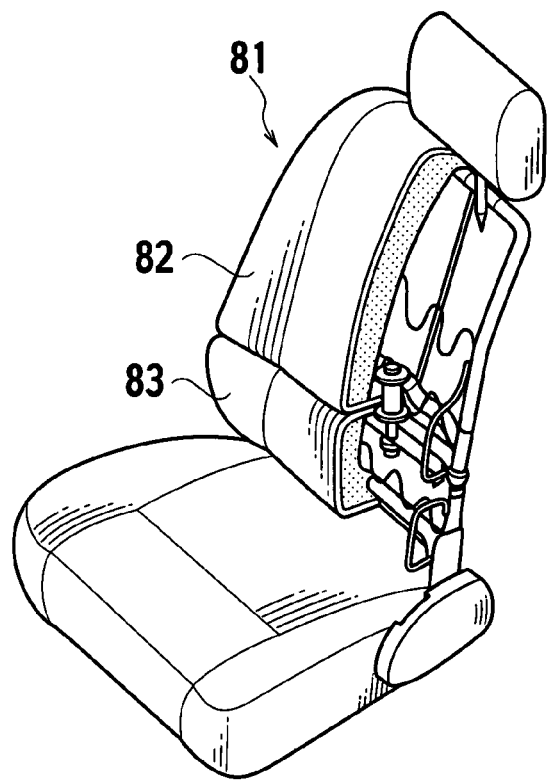
FIG. 8A is a perspective view showing a specific configuration of the seat according to a modification.
Figure 8B:
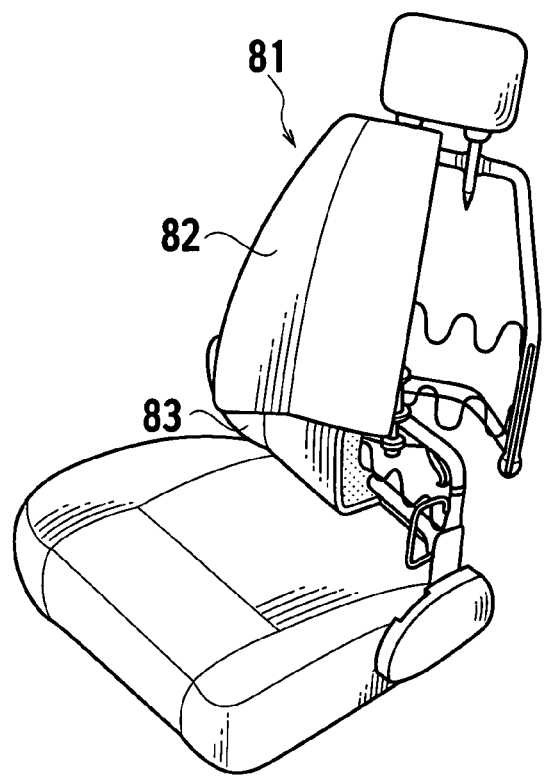
FIG. 8B is a perspective view showing a configuration of the seat in a rotated state.

Another modification is explained with reference to FIG. 8. As shown in FIG. 8A, a seatback 81 is divided into upper and lower two portions, an upper seatback 82 and a lower seatback 83 that rotatably support each other. With this arrangement, such a structure is realized that when an occupant tries to turn around backward while seated, the upper seatback 82 rotates backward following the movement as shown in FIG. 8B. By using such a seat structure and by rotating in conjunction with a steering operation by an electrical means such as a motor or by a mechanical means in which a wire connected to the steering wheel is pulled, the embodiment to which the present invention is applied can be realized. In this case also, the rotation angle gain of the seatback with respect to the steering amount by the driver and the maximum value of the rotation angle gain can be considered as described above.

Effects of the driver feeling adjusting apparatus according to the present embodiment are explained next.

Figure 9:
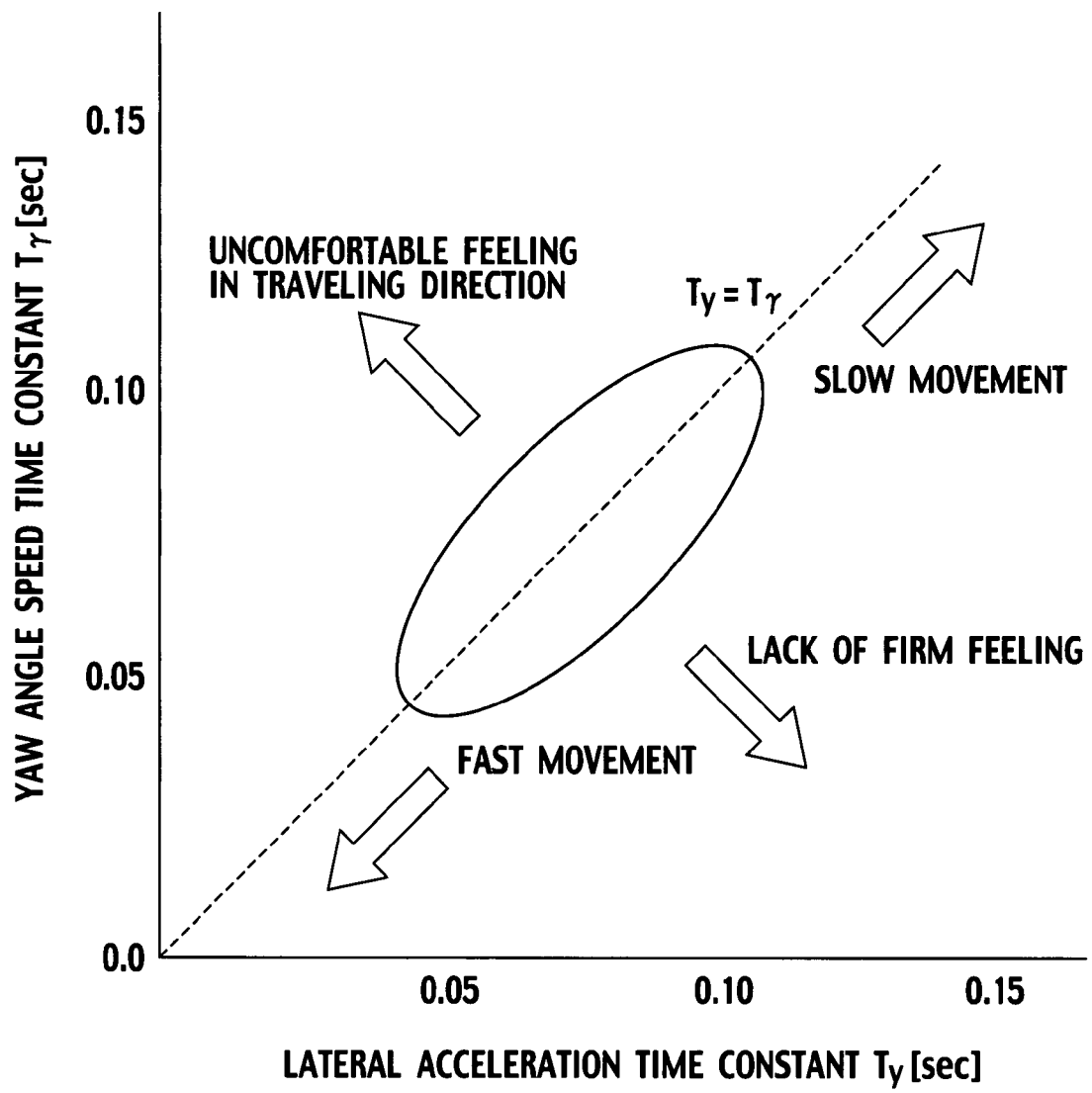
FIG. 9 is a graph showing a relationship between a lateral acceleration time constant and a yaw rate time constant.

Conventionally, it is known that the acceleration in the vehicle lateral direction and the yaw rate are indexes of drivability (for example, refer to "Technology for Improved Handling of Vehicles", edited by Society of Automotive Engineers of Japan, pp. 68 to 69, 1998). FIG. 9 is an extract from page 69 of the "Technology for Improved Handling of Vehicles", and a horizontal axis represents a time constant (time constant of lateral acceleration) of acceleration in the vehicle lateral direction and a vertical axis represents a time constant (time constant of yaw angle speed) of the yaw rate. According to "Technology for Improved Handling of Vehicles", such a region in which the time constant of lateral acceleration≈the time constant of yaw angle speed where these time constants are approximately 0.05 s to 0.10 s is considered to realize excellent drivability.

Generally, suspension is tuned such that the relationship between the time constants of the acceleration in the vehicle lateral direction and the yaw rate becomes within the above region. Within the above region, as the time constants become closer to 0.05 s, the driving stability at turning becomes higher; conversely, the time constants become closer to 0.10 s, the ride becomes more comfortable.

However, when the driving stability of a vehicle at turning improves, the rises of the acceleration in the vehicle lateral direction and the yaw rate become quick with respect to steering; therefore, a driver not used thereto feels that the rises are abrupt and cannot steer the vehicle easily, and sometimes feels the ride at turning is uncomfortable.

In the driver feeling adjusting apparatus 1 according to the present embodiment, the movable portion 4 that is displaced in the vehicle lateral direction or in the yaw direction is provided in the seat 6, and the movable portion 4 is displaced in the opposite direction to the direction of the centripetal acceleration or the yaw rate based on the steering amount by the driver, thereby making it feel that the ride at turning has become comfortable in the driver feeling.

The present invention will be explained more specifically below.

Figure 10:
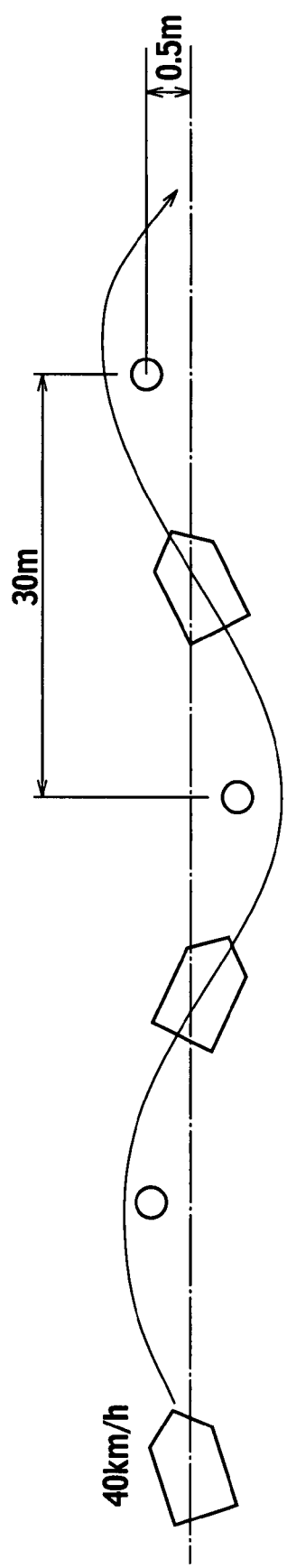
FIG. 10 is a diagram for explaining a test using an evaluation course to test the driver feeling adjusting apparatus according to the present invention.

To quantitatively indicate the effects of the present invention, a test is performed using an evaluation course shown in FIG. 10. The evaluation course is a slalom course set by arranging 10 and several pylons (cones) on a straight road. The interval between pylons is 30 m, and the pylons are alternately offset by 50 cm from the center line. The driver is given a task of driving at a regular speed at 40 km/h.

FIG. 11 shows an outline of the seat driving according to the present invention. The inventor has invented a driving method (hereinafter, this driving method is expressed as in-phase driving) to drive the side supports 12 in an inner direction of turning as shown in A in FIG. 11 as disclosed in Japanese Patent Laid-Open Publication No. 2007-001466, and the invention in which a better driving feeling can be obtained by matching the phases of the acceleration in the vehicle lateral direction and the yaw rate in terms of feeling was tested.

A test is conducted at the evaluation course shown in FIG. 10 using a vehicle to which this preceding invention is applied, and subjective impression of drivers was asked. Such comments were received that "sense that suspension is firmer", "sense that response of the vehicle has improved", and "changed to a sporty sense" compared to a normal state in which the side supports 12 are not driven as shown in B of FIG. 11. These comments are similar to those received when conventional suspension change is performed or when a vehicle characteristic is adjusted using four-wheel steering such that the acceleration in the vehicle lateral direction and the yaw rate have an excellent relationship as shown in FIG. 9. In other words, this shows that only by driving the side supports 12, an equivalent change in driving feeling is obtained to the case of four-wheel steering.

On the other hand, contrary to this preceding invention, a test was conducted at the evaluation course using a vehicle to which a driving method (hereinafter, this driving method is expressed as opposite-phase driving) to drive the side supports 12 in an outer direction of turning is applied, and subjective impression of drivers was asked. Such comments were received that "vehicle rolling has become smoother", "vehicle response has become smoother", and "relaxed driving is possible" compared to the normal state in which the seat is not driven as shown in B of FIG. 11, and it was found that feelings similar to that of vehicles that are tuned focusing on comfortable ride are obtained, to the contrary to the preceding invention.

However, driving at turning does not become difficult as with vehicles in which suspension is tuned focusing on comfortable ride, and a state enabling subjectively excellent drivability is maintained. It is considered that this is because although sense that the suspension has become soft is obtained in terms of feeling by driving the side supports 12, original characteristics of the vehicle is not changed.

Figure 12:
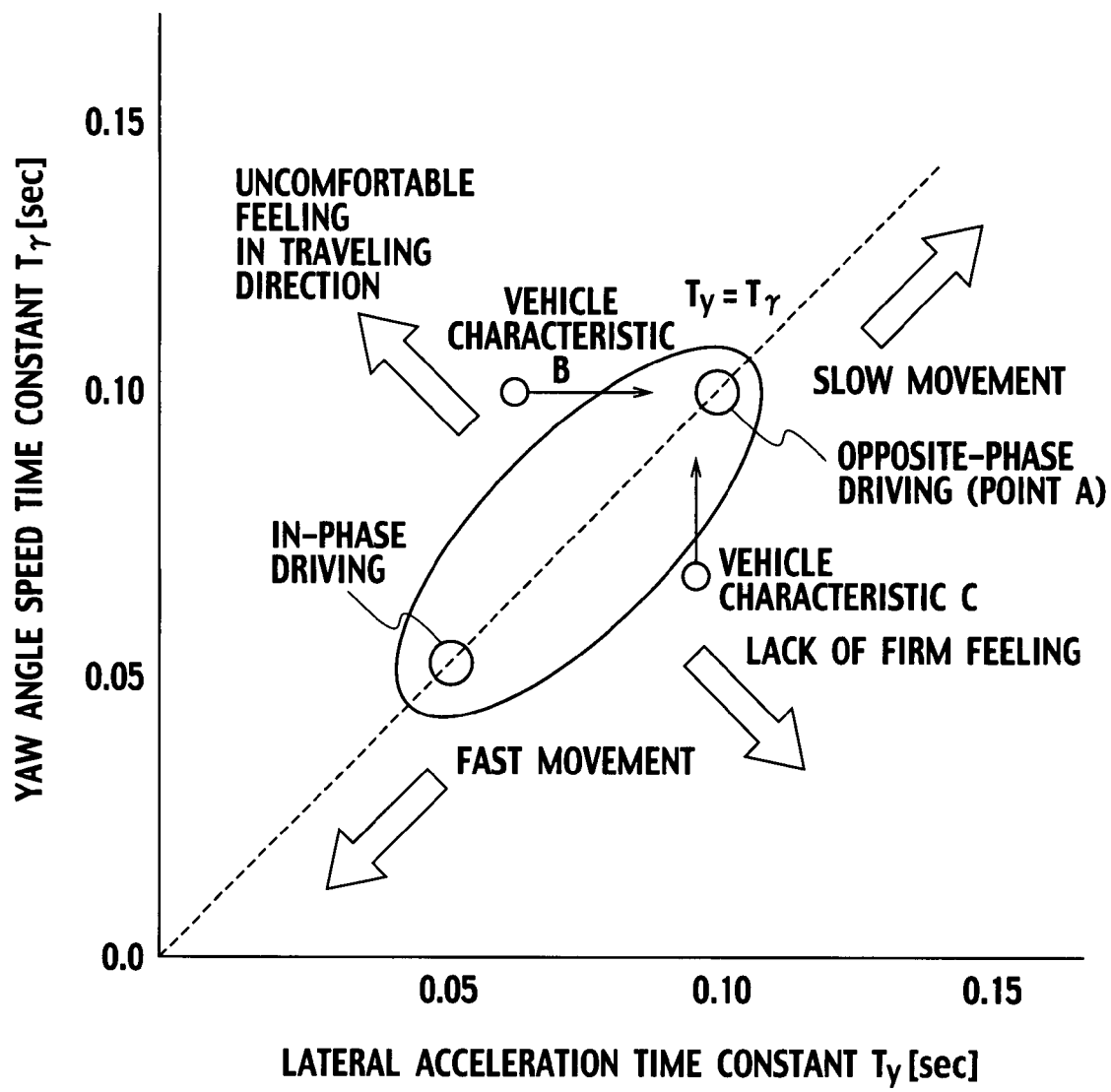
FIG. 12 is a graph showing a relationship between the lateral acceleration time constant and the yaw rate time constant in the cases of in-phase driving and opposite-phase driving.

From these results, it can be understood that while in the in-phase driving, feeling that is positioned lower left among the excellent region (region in which drivability at turning is excellent) in which a phase relationship of the acceleration in the vehicle lateral direction and the yaw rate is excellent has been obtained, in the opposite-phase driving, to the contrary, feeling that is positioned upper right has been obtained as shown in FIG. 12.

Mechanisms of obtaining such effects are explained with reference to FIG. 13. When the vehicle is turning, an inertia force acts in a lateral direction and the upper body of the driver is to be leaned toward outside of turning with respect to the vehicle. At this time, the upper body is supported by the side supports 12, and therefore, contact pressure occurs between the side supports 12 and the upper body.

For example, at the time of right wheel, the inertia force toward a left side of the vehicle acts on the upper body. Particularly focusing on the contact pressure between the side support 12 on the left side and the upper body, this contact pressure is expressed as F as shown in FIG. 13B. When steering is performed to make a turn, lateral acceleration is generated having a certain delay according to a dynamic characteristic of the vehicle, and the contact pressure F increases corresponding to the lateral acceleration. A conceptual diagram for explaining the relationship between the steering angle and the contact pressure F is illustrated in a graph shown in FIG. 13A.

Figure 13A:
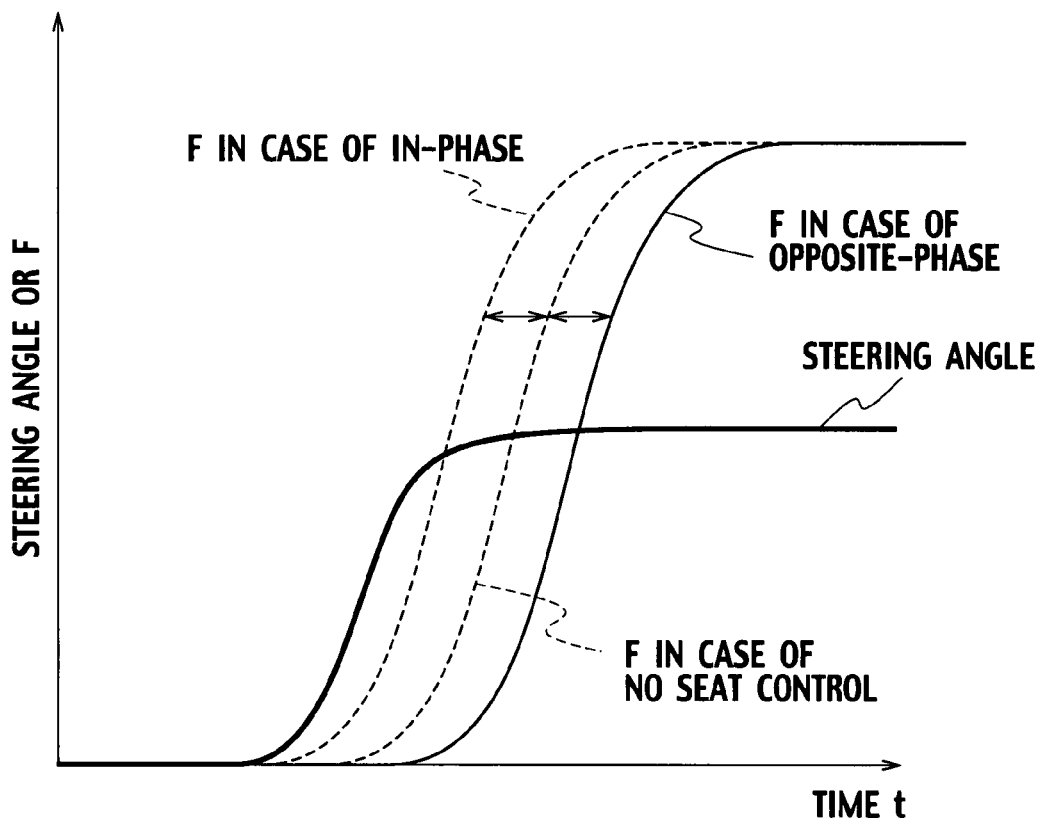
FIG. 13A is a graph for explaining a relationship between a steering angle and contact pressure between the side support frame and the driver.
Figure 13B:
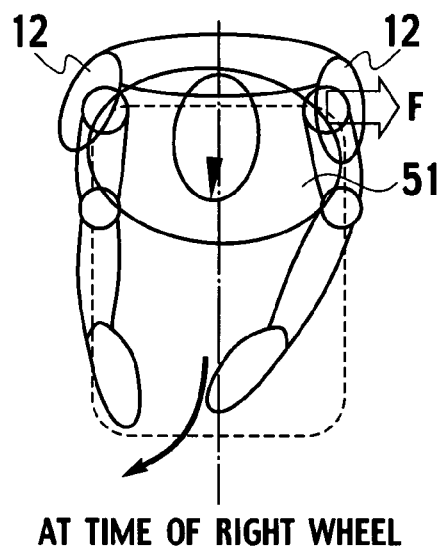
FIG. 13B is a top view showing a relationship between a steering operation by the driver and the contact pressure.

As shown in FIG. 13A, when the side supports 12 are driven in the in-phase driving, a rise of the contact pressure F becomes early compared to the case of no seat control, and when the side supports 12 are driven in the opposite-phase driving, a rise of the contact pressure F becomes late compared to the case of no seat control.

Because of the change in a time constant of the seat contact pressure F with respect to the steering angle, in the case of in-phase driving, rises of the acceleration in the vehicle lateral direction and the yaw rate become early, thereby making a driver feel that the vehicle responds quickly. In the case of opposite-phase driving, the rises of the acceleration in the vehicle lateral direction and the yaw rate become late, thereby making the driver feel that the vehicle response has become slow.

Figure 14:
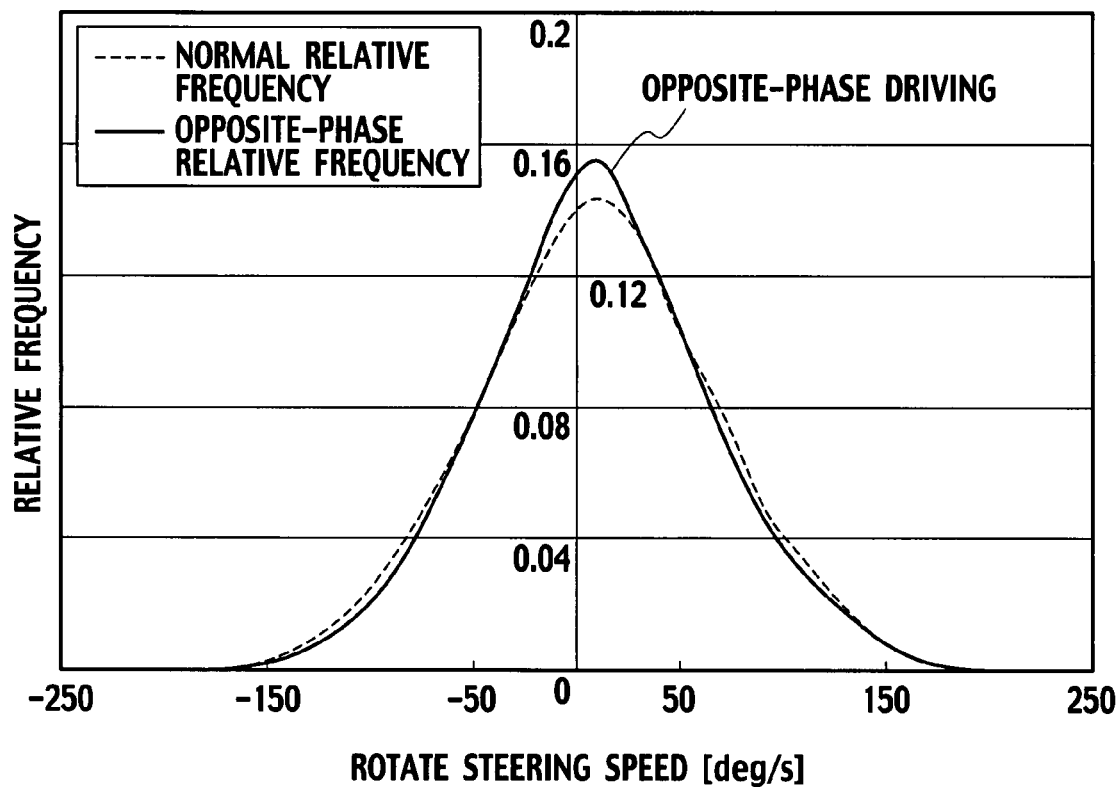
FIG. 14 is a diagram showing a steering speed-frequency histogram when slalom driving is performed.

FIG. 14 shows quantitative effects when the opposite-phase driving is performed. Steering speed-frequency histograms when the slalom driving shown in FIG. 10 is performed are compared between the normal state shown in B of FIG. 11 and an opposite-phase driving state shown in C of FIG. 11. As shown in FIG. 14, in the case of opposite-phase driving, distribution of the steering speed is small. This indicates that a sudden steering is not performed, and is considered as a result that quantitatively expresses that "relaxed driving is possible" as subjective evaluation of the driver. As a result, it can be understood that driving has changed toward stable direction.

Thus, in the driver feeling adjusting apparatus 1 according to the present embodiment, the seat 6 that has the movable portion 4 that is displaced in the vehicle lateral direction or in the yaw direction is provided, and the movable portion 4 is displaced in the opposite direction to the direction of the centripetal acceleration generated by the vehicle or the yaw rate. Therefore, it is possible to make a driver feel that ride at turning has become comfortable without changing the driving stability of the vehicle at turning.

As described above, the effects have been listed, and the effects are summarized as follows.

When the driving stability of a vehicle at turning improves, the rises of the acceleration in the vehicle lateral direction and the yaw rate become quick with respect to steering; therefore, a driver not used thereto feels that the rises are abrupt and cannot steer the vehicle easily, and sometimes feels the ride at turning is uncomfortable.

To the contrary, in the driver feeling adjusting apparatus 1 according to the present embodiment, the movable portion 4 that is provided in the seat 6 and that can be displaced in the vehicle lateral direction or in the yaw direction is displaced in the opposite direction to the direction of the centripetal acceleration or the yaw rate, thereby making the rise of the contact pressure F felt by the driver at turning occur late so that the driver feels that the rises of the acceleration in the vehicle lateral direction and the yaw rate have become late. This is evident from a fact shown in FIG. 14 that the distribution of the steering speed becomes small.

As a result, it becomes possible for the driver to steer relaxedly (easily) and to feel that ride at turning has become comfortable compared to the case of no seat control.

Moreover, in typical vehicles, only front wheels are mainly steered. In this case, there is such a relationship that while the turning movement is a steering input of flexibility 1, the vehicle lateral direction movement and the yaw movement are outputs of flexibility 2, and the time constants of the acceleration in the vehicle lateral direction and the yaw rate cannot be controlled independently.

Therefore, it has been difficult to bring the time constants of the acceleration in the vehicle lateral direction and the yaw rate within the region in which driving at turning is easy in actual vehicles that are designed considering comfortable ride and other factors.

To the contrary, in the driver feeling adjusting apparatus 1 according to the present embodiment, as shown in FIG. 12, even if vehicle characteristics are out of the region in which driving at turning is easy as points B and C as shown in FIG. 12, for example, for a vehicle having the vehicle characteristic B, by displacing the movable portion 4 in the vehicle lateral direction at turning, the rise of the acceleration of the vehicle lateral direction that is felt by the driver is controlled to be late (increasing the lateral acceleration time constant), thereby changing the vehicle characteristic felt by the driver to the point A. For a vehicle having the vehicle characteristic C, by displacing the movable portion 4 in the yaw direction at turning, the rise of yaw rate felt by the driver is controlled to be late (increasing the yaw angle speed time constant), thereby changing the vehicle characteristic felt by the driver to the point A. In other words, according to the driver feeling adjusting apparatus 1 of the present embodiment, the vehicle characteristic felt by the driver can be arbitrarily changed. Therefore, flexibility in designing vehicles is increased.

In Japanese Utility Model Application Publication No. H6-018831, a technique of displacing the entire seat at turning so as to lower the acceleration in the vehicle lateral direction that acts on the driver for decreasing tiredness of the driver is disclosed.

However, if the entire seat is displaced as the technique disclosed in Japanese Utility Model Application Publication No. H6-018831, a positional relationship of an operating system such as a steering, an axle pedal, a brake pedal, a shift lever, with the driver also changes. As a result, the driver feels that a driving operation is hard.

To the contrary, the driver feeling adjusting apparatus 1 according to the present embodiment is configured such that the seat 6 is fixed to the vehicle and only the movable portion 4 provided in the seat 6 is displaced. Therefore, even when the movable portion 4 is displaced, the positional relationship between an operating system and the driver is almost not changed, and it does not make the driver feel that the driving operation is hard.

Furthermore, if the entire seat is displaced at turning so as to decrease the acceleration in the vehicle lateral direction that acts on the driver as the technique disclosed in Japanese Published Utility Model Application No. H6-018831, although tiredness of the driver at turning decreases, accordingly, vehicle behavior information required when the driver operates the steering also decreases. Therefore, the driver feels that it is hard to operate the steering.

In other words, when the driver operates the steering, the driver determines the steering amount based on visual information (curvature radius of a curve) and tactile sense information (acceleration in the vehicle front-rear direction or acceleration in the vehicle lateral direction) as the vehicle behavior information. However, if it becomes hard for the driver to feel the acceleration in the vehicle lateral direction, which is one of the vehicle behavior information, the driver cannot properly judge the vehicle behavior at turning, a correcting operation of steering increases at turning; as a result, the driver feels that it is hard to steer the vehicle.

To the contrary, the driver feeling adjusting apparatus 1 according to the present embodiment is configured such that the seat 6 is fixed to the vehicle and only the movable portion 4 that is provided in the seat 6 is displaced. Therefore, only the rise of the acceleration in the vehicle lateral direction at turning changes, and the acceleration (steady-state value) itself in the vehicle lateral direction does not change. Therefore, the vehicle behavior information does not decrease that is required by the driver at turning, and the driver does not feel that it is hard to steer the vehicle.

Moreover, in the driver feeling adjusting apparatus 1 according to the present embodiment, the movable portion 4 is the side supports 12 that are arranged on both sides of the seat rear surface, and the side supports 12 are displaced in the vehicle lateral direction or in the yaw direction with respect to other portions of the seat 6; therefore, even when the movable portion 4 is displaced, the positional relationship between the operating system and the driver is almost not changed, and it is possible to improve driving feeling simply and at a low cost.

Furthermore, in the driver feeling adjusting apparatus 1 according to the present embodiment, the movable portion 4 is at least a part of the seat rear surface, and a part of this seat rear surface is displaced in the vehicle lateral direction or in the yaw direction with respect to other portions of the seat 6; therefore, even when the movable portion 4 is displaced, the positional relationship between the operating system and the driver is almost not changed, and it is possible to improve driving feeling simply and at a low cost.

Second Embodiment

Figure 15:
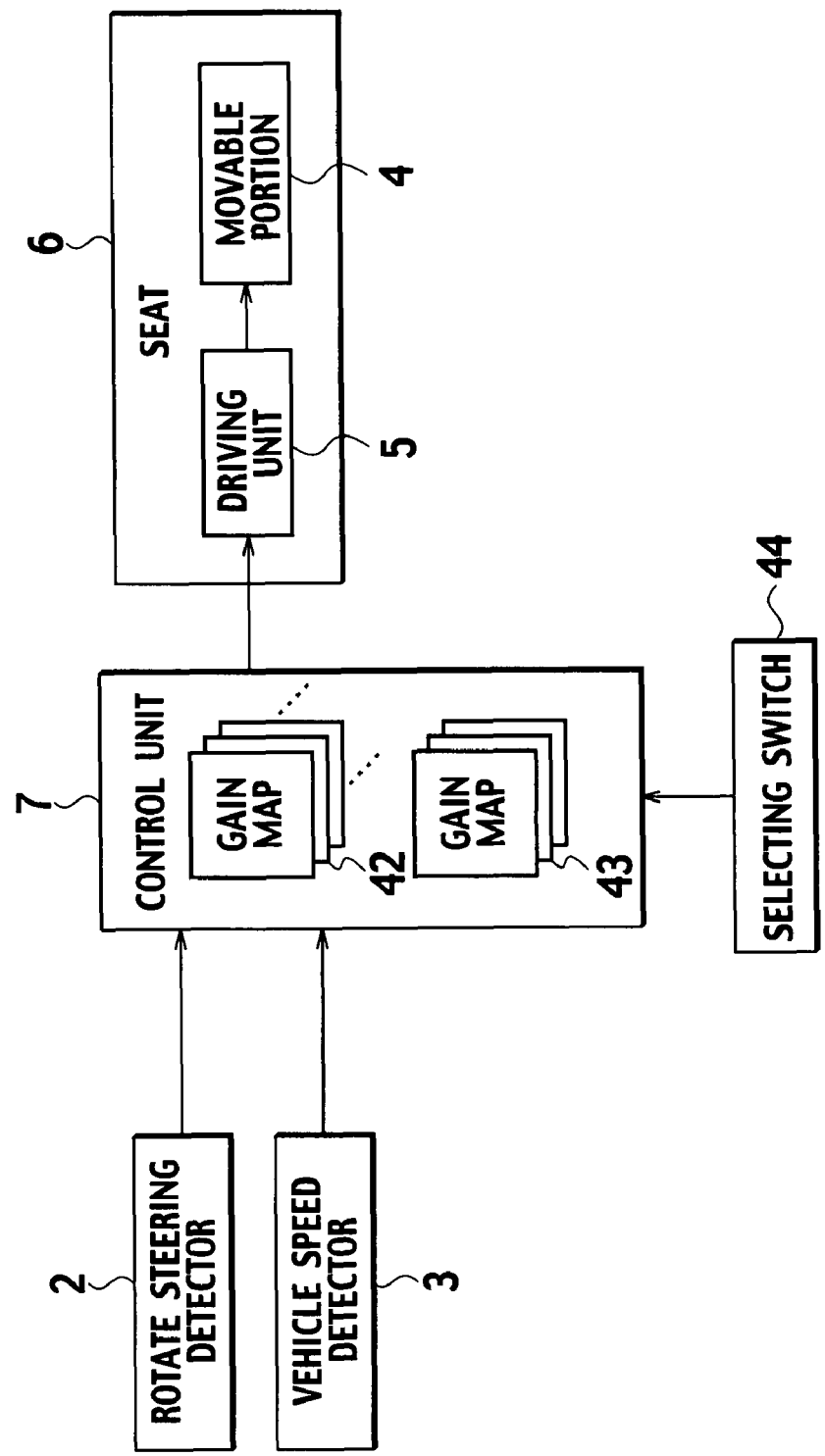
FIG. 15 is a block diagram showing a configuration of a driver feeling adjusting apparatus according to a second embodiment of the present invention.

A second embodiment of the present invention is explained next with reference to FIG. 15. As shown in FIG. 15, a driver feeling adjusting apparatus 41 according to the present embodiment differs, from the first embodiment, in that it is configured to be selectively controllable by selecting a control pattern of displacing the movable portion 4 in the same direction as the direction of the yaw rate and the centripetal acceleration generated in the vehicle based on the steering amount and a control pattern of displacing the movable portion 4 in the opposite direction to the direction of the yaw rate and the centripetal acceleration generated in the vehicle, and accordingly, the control unit 7 has gain maps 42 and 43 that are used in the two control patterns.

Moreover, the driver feeling adjusting apparatus 41 further includes a selecting switch (selecting unit) 44 for the driver to select two control patterns. Other structures are the same as that of the first embodiment, and detailed explanations will be omitted.

Furthermore, specific configuration of the seat 6 is the same as that of the first embodiment shown in FIG. 2, and detailed explanations will be omitted.

Movement of the side support frames 15a and 15b are explained next with reference to FIG. 16. Since the movement in the opposite-phase driving in which the side support frames 15a and 15b are displaced in the opposite direction to the direction of the yaw rate and the centripetal acceleration generated in the vehicle has been explained in the first embodiment, movement in the in-phase driving in which the side support frames 15a and 15b are displaced in the same direction as the direction of the yaw rate and the centripetal acceleration is explained herein.

Figure 16A:
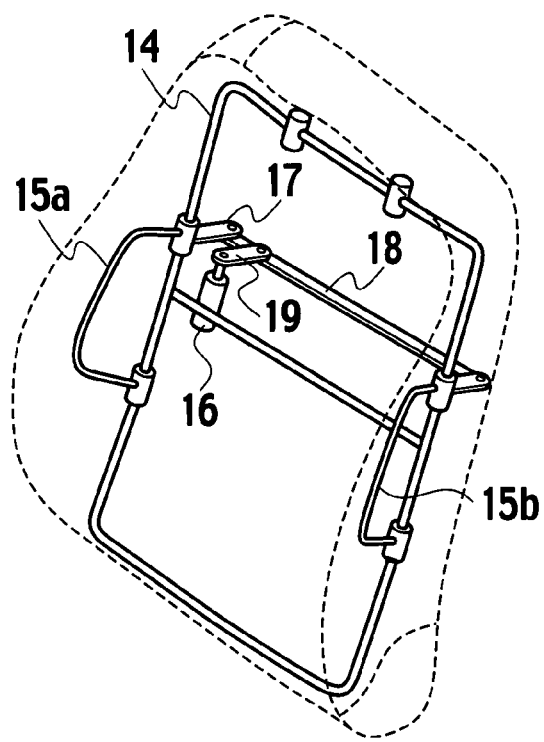
FIGS. 16A and 16B show a state at a normal time.
Figure 16B:
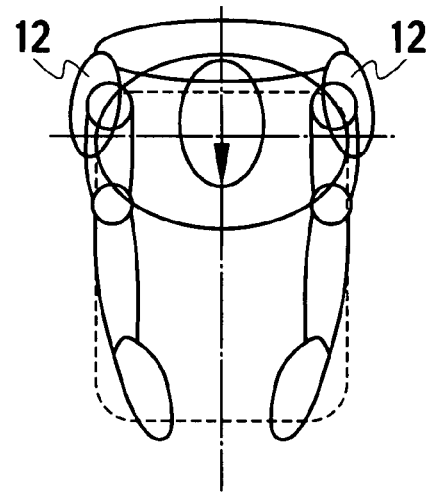

As shown in FIGS. 16A and 16B, when the vehicle is not turning, in other words, when the steering operation is not being performed by the driver (normal time), the side support frames 15a and 15b (side supports 12) on both sides are held at positions symmetric in the vehicle lateral direction. The motor 16 is not making a rotational operation, and the first to the third links 17 to 19 are not moving either.

Figure 16C:
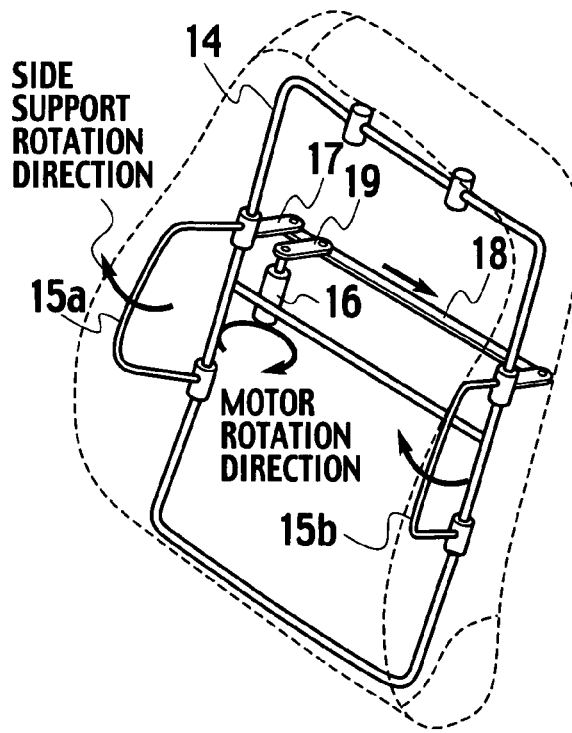
FIGS. 16C and 16D show a state at the time of right wheel.
Figure 16D:
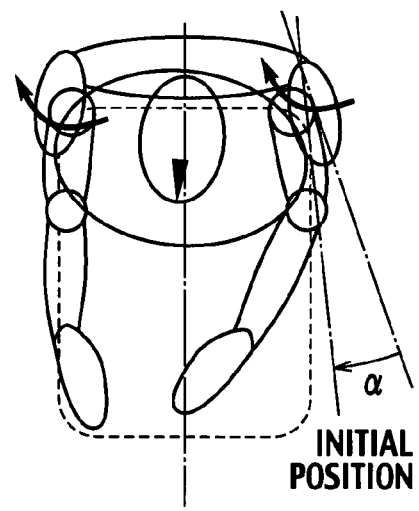

On the other hand, as shown in FIGS. 16C and 16D, when the vehicle is making a right turn, in other words, when the steering is operated to rotate rightward by the driver (at the time of right wheel), the motor 16 is caused to rotate by an angle corresponding to the steering operation in the direction shown in FIG. 16C. This rotation of the motor 16 is transmitted to the side support frames 15a and 15b on both sides through the first to the third links 17 to 19. Thus, the side support frames 15a and 15b (side supports 12) rotate by a rotational angle $\alpha$ in the same direction as the yaw direction of the vehicle at the time of right wheel from a position (initial position) shown in FIGS. 16A and 16B.

Figure 17:
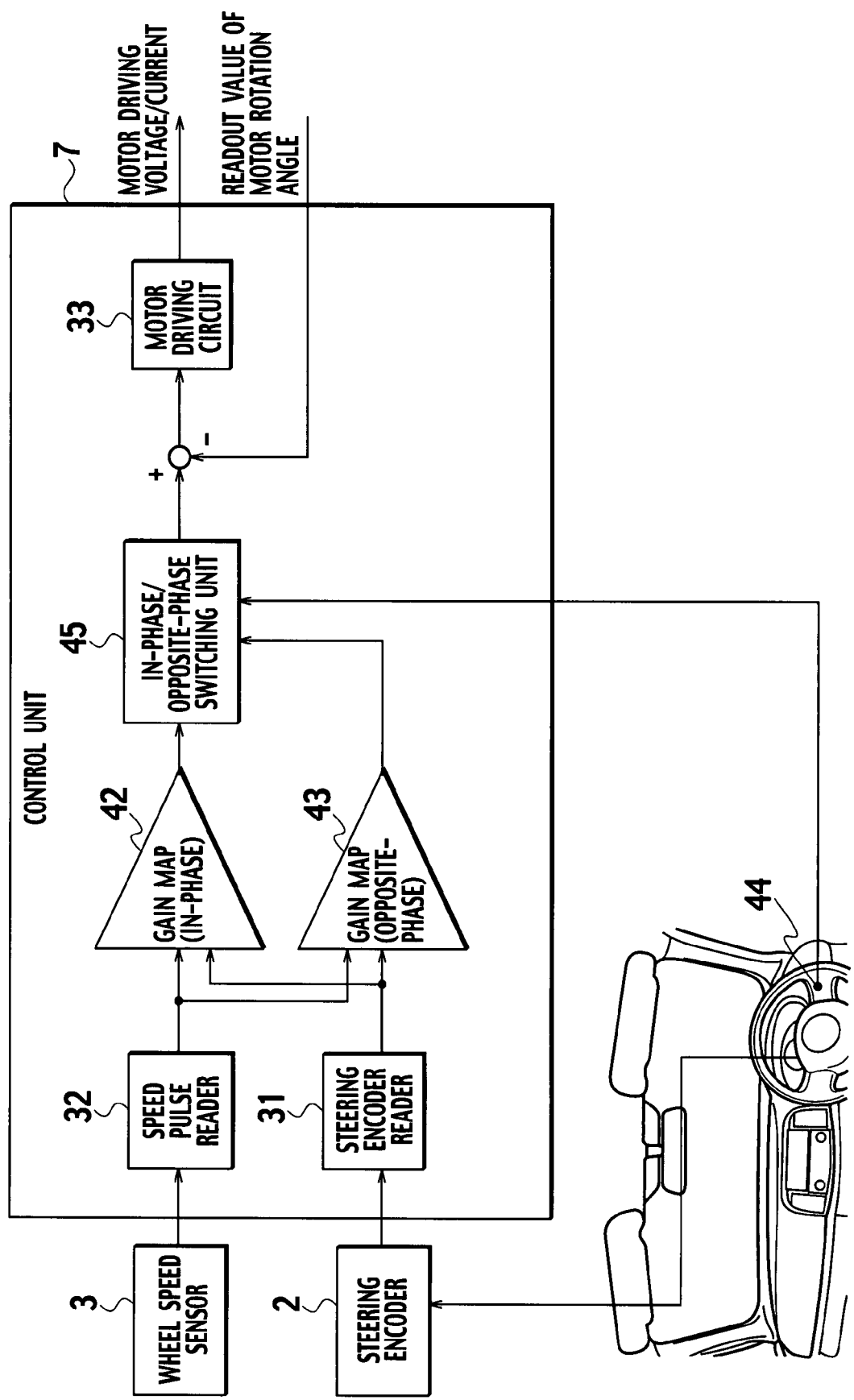
FIG. 17 is a diagram specifically showing an entire configuration of the driver feeling adjusting apparatus shown in FIG. 15.

A specific configuration of the driver feeling adjusting apparatus 41 shown in FIG. 15 is explained next with reference to FIG. 17. FIG. 17 is a diagram specifically showing an entire configuration of the driver feeling adjusting apparatus 41 shown in FIG. 15, and is a diagram particularly showing a configuration of the control unit 7 in detail. The control unit 7 includes the steering encoder reader 31 that reads a steering amount detected by the steering encoder (steering amount detector) 2, the speed pulse reader 32 that reads a speed of the vehicle detected by the wheel speed sensor (vehicle speed detector) 3, the gain map 42 that is used for the in-phase driving to drive the side supports 12 in the inner direction of turning, the gain map 43 that is used in the opposite-phase driving to drive the side supports 12 in the outer direction of turning, an in-phase/opposite-phase switching unit 45 that switches to a driving method selected by the driver with the steering switch (selecting switch) 44, and the motor driving circuit 33 that sends a driving command value to cause the motor 16 to rotate.

A rotation angle of the motor 16 installed in the seat 6 is read by an encoder or a potentiometer, and a signal thereof is input to the control unit 7.

The steering encoder 2 arranged on a steering wheel sends a signal to the control unit 7 when the steering is rotated. The control unit 7 that receives this signal counts signals from the steering encoder 2 to convert into the steering angle $\phi$, and acquires a rotation angle command value of the motor 16 by multiplying the steering angle $\phi$ by a gain obtained from the gain map 42 and 43. Furthermore, the in-phase/opposite-phase switching unit 45 selects either the rotation angle command value of the in-phase driving or the rotation angle command value of the opposite-phase driving corresponding to the driving method selected by the driver with the steering switch 44. The selected rotation angle command value is input to the motor driving circuit 33 to provide a driving voltage/current to the motor 16. At this time, feedback on a current value of the rotation angle of the motor 16 is given to a preceding stage of the motor driving circuit 33, and based on this current value, a position control is performed.

When the in-phase driving and the opposite-phase driving are switched, the control unit 7 controls not to give uncomfortable feeling to the driver by continuously changing the two driving methods.

Furthermore, the control unit 7 uses the gain maps 42 and 43 that differ when the vehicle is at a low speed and at a high speed. The speed pulse reader 32 reads speed pulses from the wheel speed sensor 3 to detect a vehicle speed, and corresponding to this vehicle speed, the control unit 7 selects the gain map of high speed or the gain map of low speed to use.

Thus, the control unit 7 selects a gain map depending on the vehicle speed from each of the gain map 42 and 43, and based on the selected gain maps, the angle displacement $\alpha$ or $\beta$ of the side supports 12 is acquired from the steering angle $\phi$.

A method of setting the maximum value of the angle displacement $\alpha$ of the side supports 12 is explained with reference to FIG. 18. The method of setting the maximum value of the angle displacement $\beta$ is the same as that of the first embodiment explained in FIG. 5, and redundant explanations will be omitted.

Figure 18A:
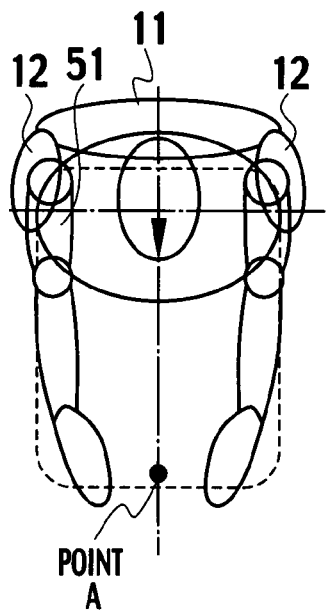
FIG. 18A is a diagram showing an upper body of a driver viewed from above when a vehicle is driving straight.
Figure 18B:
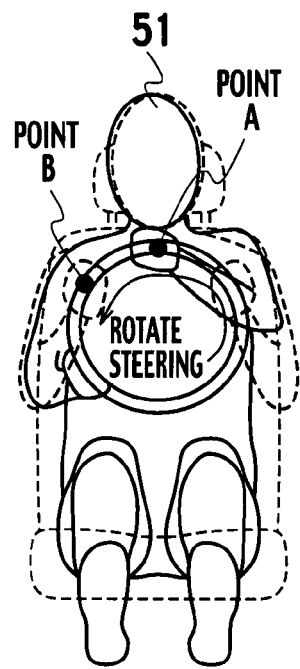
FIG. 18B shows a state in which a point on a steering that is positioned at the point A when driving straight is moved to the point B.
Figure 18C:
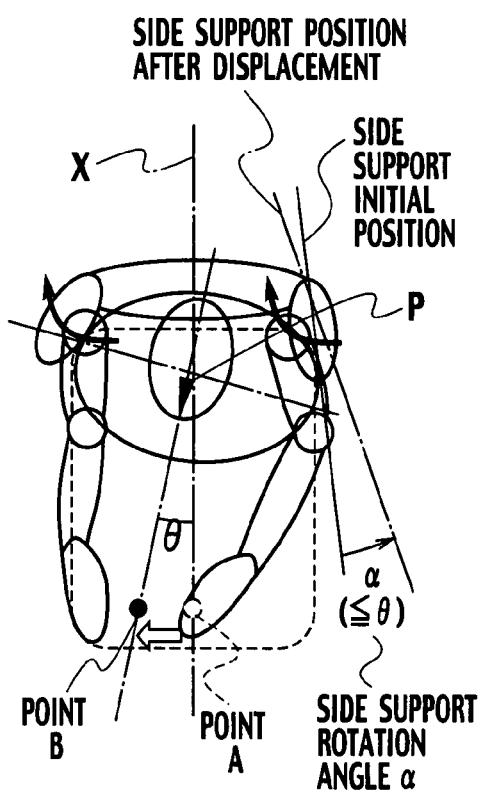
FIG. 18C is a diagram showing the upper body of the driver viewed from above in the state shown in FIG. 18B.

FIG. 18A is a diagram showing the upper body of the driver 51 viewed from above when the vehicle is driving straight, and the point A indicates a point positioned at the top of the steering wheel at the time of driving straight. FIG. 18B is a diagram showing the driver 51 viewed from front, and the top of the steering that is positioned at the point A when driving straight is moved to the point B by a rightward steering operation by the driver 51. FIG. 18C is a diagram showing the upper body of the driver 51 viewed from above in this state, and as shown in FIG. 18C, the displacement amount α of the side supports 12 on both sides satisfies $0<\alpha\leqq\theta$, where θ represents an angle formed by the line between the eye point P of the driver 51 and the point B and the axis X in a vehicle front-rear direction.

It is thus set because when the driver 51 twists the upper body at the time of making a turn, a posture change of the upper body is made within about this range, and by setting the gain within this range, the side supports 12 moves following the twist of the upper body of the driver 51, thereby enabling comfortable turning.

Figure 18D:
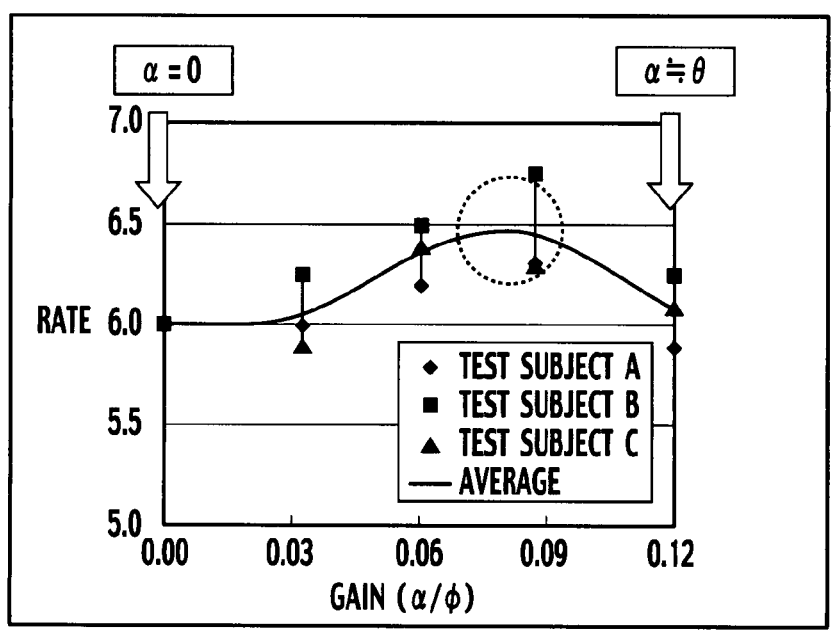
FIG. 18D is a graph showing a result of a verification test.

FIG. 18D shows a test result of verification of the above effects. A horizontal axis represents the angle displacement α of the side supports 12 with respect to the steering angle (steering angle φ) expressed in numerical values. These numerical values themselves are shown merely as reference values since the values change according to a gear ratio of a steering. The gain 0 indicates that the side supports 12 are not driven at all. Focusing on a driving feeling, particularly on drivability right after steering is started, feeling in a state of the gain 0 is set to a standard of 6.0 points, and subjective evaluation points when the gain is changed are plotted on a vertical axis.

The gain 0 corresponds to α=0, and a point of the gain 0.12 corresponds to α≈θ. As a result of performing evaluation by test subjects A to C, it is confirmed that an evaluation value becomes maximal in a portion circled by a dotted line in FIG. 18D when $0<\alpha<\theta$.

Although in an actual vehicle, the diameter of a steering wheel and the steering gear ratio differ depending on a vehicle type, in this example, for convenience, a value of the angle θ formed by the line between the eye point P of the driver 51 and the point B and the axis X in the vehicle front-rear direction can be determined on the assumption that the steering wheel has a typical diameter (=approximately 330 mm to 380 mm) and the gear ratio of about 13 to 20. Similarly, the upper limit of the gain changes also depending on a position of the eye point P of the driver 51 with respect to the steering wheel, in other words, an amount of sliding backward and forward of the seat 6. However, a swinging angle of the side supports 12 need not necessarily be adjusted by detecting the sliding amount of the seat 6 to strictly maintain this relationship, and the angle θ can be determined assuming the driver 51 having the average physique.

The reason why it is not necessary to control the movement of the side supports 12 strictly with respect to the steering wheel, the steering gear ratio, and the position of the eye point P is because there is no point of performing a strict position control since soft cushions are arranged on the surfaces of the side supports 12 usually.

Thus, the yaw rotation angle α as the displacement amount of the side supports 12 is set to satisfy $0<\alpha\leqq\theta$ with respect to the angle θ formed by the line between the point A positioned at the top of the steering wheel when driving straight and the eye point P of the driver 51 and the axis X in the vehicle front-rear direction.

Thus, the driver feeling adjusting apparatus 41 according to the present embodiment is configured to be selectively controllable by selecting the control pattern (in-phase driving) of displacing the movable portion 4 in the same direction as the direction of the yaw rate and the centripetal acceleration generated in the vehicle and the control pattern (opposite-phase driving) of displacing the movable portion 4 in the opposite direction to the direction of the yaw rate and the centripetal acceleration generated in the vehicle, and the two control patterns are continuously changed. Therefore, it is possible to make the driver feel as if the vehicle characteristic has changed without changing the characteristic of the vehicle itself.

Moreover, in the driver feeling adjusting apparatus 41 according to the present embodiment, the movable portion 4 is controlled in the control pattern selected by the selecting switch 44. Therefore, the control pattern can be switched by an intention of the driver, and it is possible to arbitrarily select comfortable feeling by the driver, for example, by setting to the in-phase driving in a mountain path and setting to the opposite-phase driving on an express way in which curves are relatively gentle.

Third Embodiment

Figure 19:
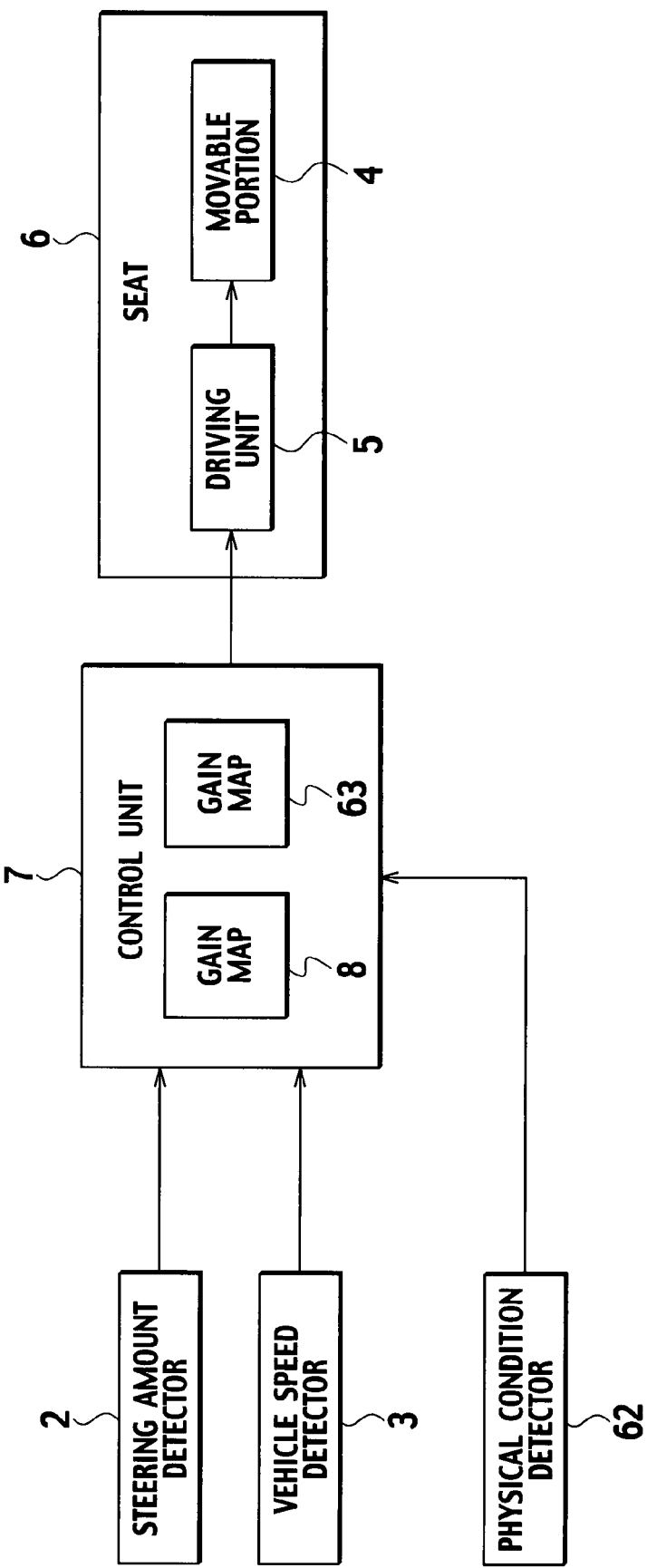
FIG. 19 is a block diagram showing a configuration of a driver feeling adjusting apparatus according to a third embodiment of the present invention.

A third embodiment of the present invention is explained next with reference to FIG. 19. As shown in FIG. 19, a driver feeling adjusting apparatus 61 of the present embodiment differs, from the first embodiment, in that a physical condition detector 62 is further included that detects a physical condition of the driver. Accordingly, the control unit 7 has a gain map 63 to selectively or continuously switch control patterns based on an output from the physical condition detector 62. Other structures are the same as that of the first embodiment, and detailed explanations will be omitted.

Further, a specific configuration and movement of the seat 6 are the same as that of the first embodiment shown in FIGS. 2 and 3, and detailed explanations will be omitted.

Figure 20:
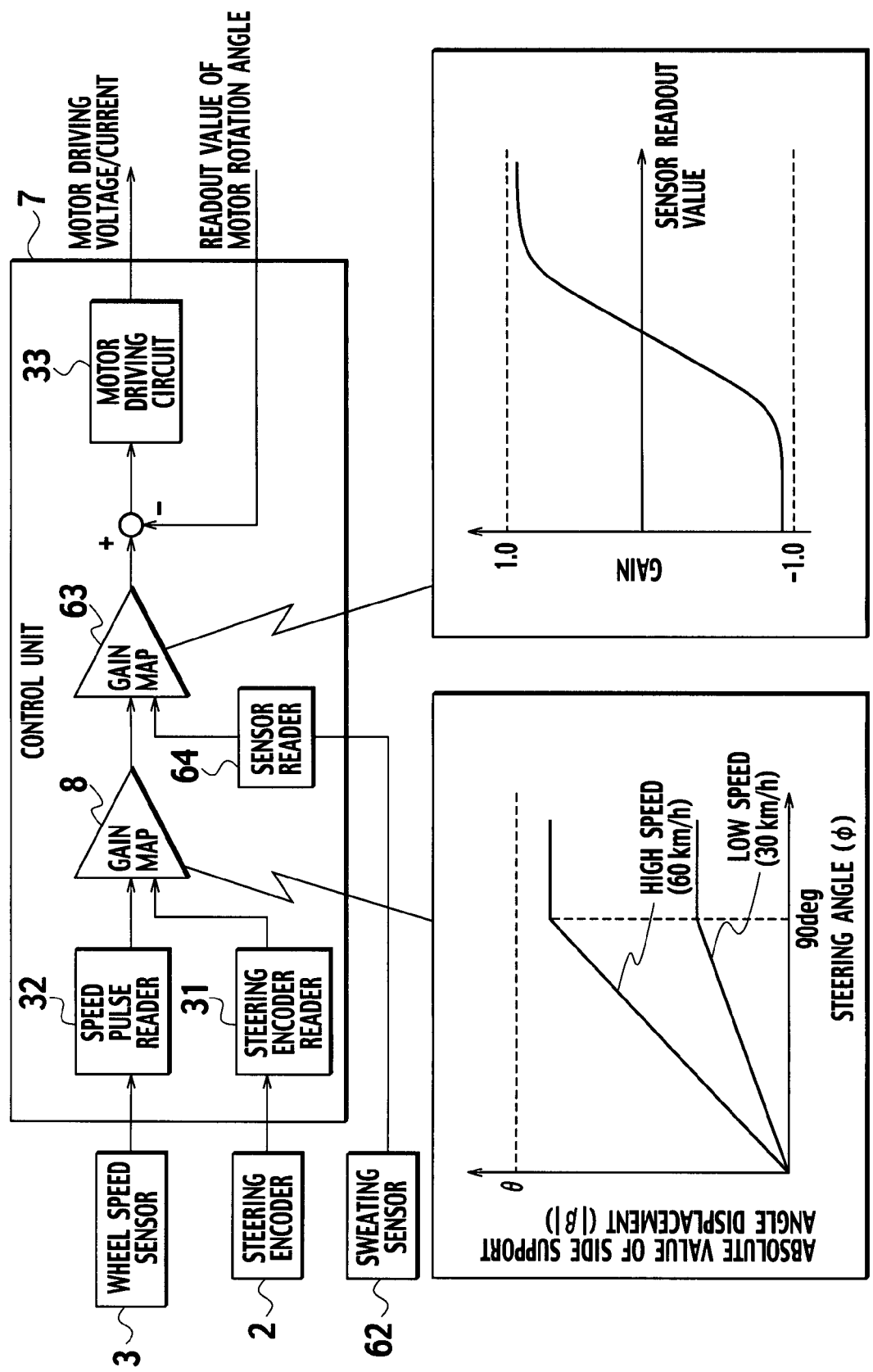
FIG. 20 is a diagram specifically showing an entire configuration of the driver feeling adjusting apparatus shown in FIG. 19, and a graph showing an example of a gain map.

A specific configuration of the driver feeling adjusting apparatus 61 shown in FIG. 19 is explained next with reference to FIG. 20. FIG. 20 is a diagram specifically showing an entire configuration of the driver feeling adjusting apparatus 61 shown in FIG. 19, and a diagram particularly showing a configuration of the control unit 7 in detail. The control unit 7 includes the steering encoder reader 31 that reads a steering amount detected by the steering encoder (steering amount detector) 2, the speed pulse reader 32 that reads a speed of the vehicle detected by the wheel speed sensor (vehicle speed detector) 3, the gain map 8 that defines a displacement amount of the movable portion 4 from the steering amount, a sensor reader 64 that reads a sweating condition (physical condition) detected by the sweating sensor (physical condition detector) 62, the gain map 63 to switch between the in-phase driving and the opposite-phase driving corresponding to the physical condition of the driver, and the motor driving circuit 33 that sends a driving command value to cause the motor 16 to rotate.

A rotation angle of the motor 16 installed in the seat 6 is read by an encoder or a potentiometer, and a readout value thereof is input to the control unit 7.

The steering encoder 2 arranged on a steering wheel sends a signal to the control unit 7 when the steering is rotated. The control unit 7 that receives this signal counts signals from the steering encoder 2 to convert into the steering angle φ, and acquires a rotation angle command value of the motor 16 by multiplying the steering angle φ by a gain obtained from the gain map 8.

A shown in FIG. 20, the control unit 7 uses the different gain map 8, for example, depending on whether the vehicle speed is low (approximately 30 km/h) or high (approximately 60 km/h), and determines the rotation angle command value of the motor 16 with respect to the steering angle φ, using the gain map 8 selected corresponding to the speed.

While the gain map 8 of the angle displacement β of the side supports 12 with respect to the steering angle φ is shown in this example, it is preferable to prepare a map of the gain in the angle displacement β of the side supports 12 with respect to the rotation angle displacement of the motor 16 considering dimensions of the first to the third links 17 to 19, in practice.

As shown in FIG. 20, the gain map 8 has a linear characteristic both at the time of low speed of 30 km/h and at the time of high speed of 60 km/m, in which the gain increases as the steering angle φ increases. However, the angle displacement β is limited by saturating the angle displacement β when the steering angle φ reaches 90°.

As described, the control unit 7 selects the gain map 8 depending on the speed of the vehicle, and acquires the angle displacement β of the side supports 12 from the steering angle φ based on the selected gain map 8. However, since both the in-phase driving and the opposite-phase driving are applied in the present embodiment, the range of the side support angle displacement β is $-\theta \leqq \beta \leqq \theta$ using the angle θ that has been defined in the first embodiment. Therefore, the vertical axis of the gain map 8 is expressed as an absolute value of β, |β|.

Upon thus acquiring the rotation angle command value, it is determined whether the in-phase driving or the opposite-phase driving by multiplying the rotation angle command value by the gain obtained from the gain map 63.

The gain map 63 outputs values from −1 to 1 as a gain to determine whether the in-phase driving or the opposite-phase driving, and a horizontal axis represents a readout value of the sweating sensor 62. The readout values have been calibrated such that a sweating condition of the driver at a calm state is 0, and in this example, the value of the gain map 63 is set to change in a positive direction as a sweating amount increases.

Therefore, when the output finally obtained by multiplying by the gain of the gain map 63 takes a positive value, the opposite-phase driving is applied, and when a negative value, the in-phase driving is applied. In this example, when the sweating amount of the driver is small and the driver maintains the calm state, the in-phase driving is performed to realize comfortable driving, and when the sweating amount increases and a driving load increases, the opposite-phase driving is performed to give the driver driving feeling that relaxes the driver.

While the case in which the driving direction is changed corresponding to the sweating amount has been described as an example, other than this example, using publicly known techniques to sense a load condition of a human, for example, by setting a camera in the interior of the vehicle as the physical condition detector 62 to recognize a facial expression of the driver, or by measuring a heartbeat or breath, output values thereof can be given as the horizontal axis of the gain map 63.

When it is determined whether to perform the in-phase driving or the opposite-phase driving by multiplying by the value of the gain map 63, the acquired rotation angle command value is input to the motor driving circuit 33 to provide a driving voltage/current to the motor 16, thereby driving the motor 16 to displace the side supports 12. At this time, feedback on a current value of the rotation angle of the motor 16 is given to a preceding stage of the motor driving circuit 33, and based on this current value, a position control is performed.

As described, the driver feeling adjusting apparatus 61 according to the present embodiment further includes the physical condition detector 62, and based on the output of the physical condition detector 62, the control pattern is selectively or continuously switched. Therefore, the control pattern can be switched corresponding to the physical condition of the driver, and it is possible to always provide comfortable driving to the driver.

Fourth Embodiment

A fourth embodiment of the present invention is explained next with reference to FIG. 21. As shown in FIG. 21, a driver feeling adjusting apparatus 71 according to the present embodiment differs, from the first embodiment, in that a driving condition detector 72 is further included that detects a driving condition of a vehicle, and other structures are the same as that of the third embodiment and detailed explanations will be omitted.

While in the third embodiment, the in-phase driving and the opposite-phase driving are switched corresponding to the physical condition of the driver, in the driver feeling adjusting apparatus 71 according to the present embodiment, the in-phase driving and the opposite-phase driving are switched corresponding to the driving condition of the vehicle, and in this point, the driver feeling adjusting apparatus 71 differs from the third embodiment.

Therefore, as the horizontal axis of the gain map 63 shown in FIG. 20C of the third embodiment, the driving conditions such as the yaw rate and the acceleration in the vehicle lateral direction are set. When the yaw rate of the vehicle is high or when the lateral acceleration is high, it is natural that a load on the driver increases. Therefore, by setting the yaw rate or the acceleration in the vehicle lateral direction as the horizontal axis of the gain map 63, it is possible to switch to an optimal control pattern.

Thus, such a control becomes possible that by detecting, for example, the lateral acceleration of the vehicle, in a driving region of low lateral acceleration, the opposite-phase driving is performed on the seat to provide relaxed driving feeling to the driver, and in a driving region of high lateral acceleration in which turnability is important, the in-phase driving is performed on the seat.

As described, the driver feeling adjusting apparatus 71 according to the present embodiment further includes the driving condition detector 72 that detects the driving condition of a vehicle, and is configured to selectively or continuously switch the control pattern based on the output of the driving condition detector 72. Therefore, the driving direction of the seat can be switched corresponding to the driving condition of the vehicle, and it becomes possible to provide driving feeling corresponding to a driving scene to the driver.

As described above, the driver feeling adjusting apparatus of the present invention has been explained based on the embodiments shown in the drawings. The present invention, however, is not limited to the embodiments and the configurations of respective parts are replaced by any configurations having the same function as that of the present invention.

Description has been made of the embodiments to which the invention created by the inventors of the present invention is applied. However, the present invention is not limited to the descriptions and the drawings, which form a part of the disclosure of the present invention according to these embodiments. Specifically, all of other embodiments, examples, operational techniques and the like, which are made by those skilled in the art based on these embodiments, are naturally incorporated in the scope of the present invention. The above is additionally described at the end of this specification.

The entire content of Japanese Patent Application No. TOKUGAN 2006-122199 with a filing date of Apr. 26, 2006, and Japanese Patent Application No. TOKUGAN 2007-060775 with a filing date of Mar. 9, 2007 is hereby incorporated by reference.

What is claimed is:

1. A driver feeling adjusting apparatus comprising:
   a seat that is fixed to a vehicle and on which a driver is seated;
   a movable portion that is provided in the seat and that can be displaced in a vehicle lateral direction or in a yaw direction; and
   a control unit that displaces the movable portion in an opposite direction to a direction of a centripetal acceleration or a yaw rate, at turning, wherein the control unit automatically adjusts a moving direction of the seat,
   wherein the movable portion comprises a pair of right and left side supports that are arranged on both sides of a rear surface of the seat, and
   wherein the side supports are displaced in the yaw direction or the vehicle lateral direction with respect to other portions of the seat.

2. The driver feeling adjusting apparatus according to claim 1, wherein the control unit selectively controls a control pattern in which the movable portion is displaced in an identical direction to the direction of the centripetal acceleration or the yaw rate at turning and a control pattern in which the movable portion is displaced in the opposite direction to the direction of the centripetal acceleration or the yaw rate at turning, and continuously changes two patterns.

3. The driver feeling adjusting apparatus according to claim 2, further comprising a selecting unit with which the driver selects from the two control patterns,
   wherein the control unit controls the movable portion in a control pattern selected by the selecting unit.

4. The driver feeling adjusting apparatus according to claim 2, further comprising a physical condition detector that detects a physical condition of the driver,
   wherein the control unit switches the control patterns selectively or continuously based on an output from the physical condition detector.

5. The driver feeling adjusting apparatus according to claim 2, further comprising a driving condition detector that detects a driving condition of the vehicle, wherein:
   the control unit switches the control patterns selectively or continuously based on an output from the driving condition detector, and
   the driving condition of the vehicle includes:
      the yaw rate, and
      an acceleration in the vehicle lateral direction.

6. A driver feeling adjusting apparatus comprising:
   a seat that is fixed to a vehicle and on which a driver is seated;
   a movable portion that is provided in the seat and that can be displaced in a vehicle lateral direction or in a yaw direction; and
   a control unit that displaces the movable portion in an opposite direction to a direction of a centripetal acceleration or a yaw rate, at turning, wherein the control unit automatically adjusts a moving direction of the seat,
   wherein the control unit selectively controls a control pattern in which the movable portion is displaced in an identical direction to the direction of the centripetal acceleration or the yaw rate at turning and a control pattern in which the movable portion is displaced in the opposite direction to the direction of the centripetal acceleration or the yaw rate at turning, and continuously changes two patterns.

7. A driver feeling adjusting apparatus comprising:
   a seat that is fixed to a vehicle and on which a driver is seated;
   a movable portion that is provided in the seat and that can be displaced in a vehicle lateral direction or in a yaw direction: and
   a control unit that displaces the movable portion in an opposite direction to a direction of a centripetal acceleration or a yaw rate, at turning, wherein the control unit automatically adjusts a moving direction of the seat, wherein:
   the movable portion is a part of at least a rear surface of the seat, and
   the part of at least the rear surface of the seat is displaced in the yaw direction or the vehicle lateral direction with respect to other portions of the seat.

8. The driver feeling adjusting apparatus according to claim 5, wherein:
   when the acceleration in the vehicle lateral direction is detected by the driving condition detector, the control unit makes at least one of the following operations:
      in a driving region of a low lateral acceleration, performing an opposite-phase driving on the seat to provide a relaxed driving feeling to the driver, and
      in a driving region of a high lateral acceleration in which a turnability is important, performing an in-phase driving on the seat.

9. The driver feeling adjusting apparatus according to claim 6, further comprising a driving condition detector that detects a driving condition of the vehicle, wherein:
   the control unit switches the control patterns selectively or continuously based on an output from the driving condition detector, and
   the driving condition of the vehicle includes:
      the yaw rate, and
      an acceleration in the vehicle lateral direction.

10. The driver feeling adjusting apparatus according to claim 6, further comprising a selecting unit with which the driver selects from the two control patterns,
    wherein the control unit controls the movable portion in a control pattern selected by the selecting unit.

11. The driver feeling adjusting apparatus according to claim 9, wherein:
    when the acceleration in the vehicle lateral direction is detected by the driving condition detector, the control unit makes at least one of the following operations:
       in a driving region of a low lateral acceleration, performing an opposite-phase driving on the seat to provide a relaxed driving feeling to the driver, and
       in a driving region of a high lateral acceleration in which a turnability is important, performing an in-phase driving on the seat.

* * * * *